United States Patent
Burcher et al.

(10) Patent No.: US 12,209,019 B2
(45) Date of Patent: Jan. 28, 2025

(54) CATALYSED PROCESS OF PRODUCTION OF HYDROGEN FROM SILYLATED DERIVATIVES AS HYDROGEN CARRIER COMPOUNDS

(71) Applicant: HYSILABS, SAS, Aix-en-Provence (FR)

(72) Inventors: Benjamin Burcher, Saint-Jorioz (FR); Vincent Lome, Chateaurenard (FR); Remy Benoit, Villeneuves-les-Avignon (FR)

(73) Assignee: HYSILABS, SAS, Aix-en-Provence (FR)

( * ) Notice: Subject to any disclaimer, the term of this patent is extended or adjusted under 35 U.S.C. 154(b) by 705 days.

(21) Appl. No.: 17/309,049

(22) PCT Filed: Oct. 31, 2019

(86) PCT No.: PCT/EP2019/079909
§ 371 (c)(1),
(2) Date: Apr. 16, 2021

(87) PCT Pub. No.: WO2020/108913
PCT Pub. Date: Jun. 4, 2020

(65) Prior Publication Data
US 2022/0033259 A1    Feb. 3, 2022

(30) Foreign Application Priority Data
Nov. 28, 2018  (EP) .................................. 18306578

(51) Int. Cl.
*C01B 3/06*  (2006.01)
*C08G 77/12*  (2006.01)

(52) U.S. Cl.
CPC .............. *C01B 3/065* (2013.01); *C08G 77/12* (2013.01); *C01B 2203/1041* (2013.01)

(58) Field of Classification Search
None
See application file for complete search history.

(56) References Cited

U.S. PATENT DOCUMENTS 2,411,158 A    11/1946 Edward
2,988,537 A  *  6/1961 Wiley .................. C07C 47/198
                                                    568/336

(Continued)

FOREIGN PATENT DOCUMENTS

CN    1926061 A    3/2007
CN    1935853 A    3/2007

(Continued)

OTHER PUBLICATIONS

International Search Report and Written Opinion mailed Feb. 25, 2020 in PCT Application No. PCT/EP2019/079909.

(Continued)

*Primary Examiner* — Wayne A Langel
(74) *Attorney, Agent, or Firm* — MASCHOFF BRENNAN (57) ABSTRACT

The present invention relates to a catalysed process of production of hydrogen from silylated derivatives as hydrogen carrier compounds. The present invention also relates to a new catalyst used in the catalysed process of production of hydrogen from silylated derivatives as hydrogen carrier compounds.

19 Claims, 1 Drawing Sheet

(56) References Cited

U.S. PATENT DOCUMENTS

| | | | |
|---|---|---|---|
| 3,114,778 | A | 12/1963 | Fritz et al. |
| 3,117,838 | A | 1/1964 | Frank et al. |
| 3,250,808 | A | 5/1966 | Moore et al. |
| 3,435,001 | A | 3/1969 | Merrill |
| 3,447,237 | A | 6/1969 | Tokuyama et al. |
| 3,673,115 | A | 6/1972 | Linsen et al. |
| 3,734,962 | A | 5/1973 | Niederpruem et al. |
| 3,826,768 | A | 7/1974 | Osonoi et al. |
| 3,903,031 | A | 9/1975 | Matsuda et al. |
| 3,903,032 | A | 9/1975 | Matsuda et al. |
| 3,968,199 | A | 7/1976 | Bakay |
| 4,002,512 | A | 1/1977 | Lim |
| 4,012,349 | A * | 3/1977 | Matsuda ............ C08G 18/4833 528/80 |
| 4,085,137 | A | 4/1978 | Mitsch et al. |
| 4,155,712 | A | 5/1979 | Taschek |
| 4,262,072 | A | 4/1981 | Wendling et al. |
| 4,321,404 | A | 3/1982 | Williams et al. |
| 4,377,564 | A | 3/1983 | Dahlberg |
| 4,472,480 | A | 9/1984 | Olson |
| 4,614,667 | A | 9/1986 | Larson et al. |
| 4,637,867 | A | 1/1987 | Herbst, Jr. |
| 4,654,233 | A | 3/1987 | Grant et al. |
| 4,855,184 | A | 8/1989 | Klun et al. |
| 4,968,116 | A | 11/1990 | Hulme-Lowe et al. |
| 5,002,978 | A | 3/1991 | Goldenberg |
| 5,148,511 | A | 9/1992 | Savu et al. |
| 5,162,397 | A | 11/1992 | Descamps et al. |
| 5,239,026 | A | 8/1993 | Babirad et al. |
| 5,365,261 | A | 11/1994 | Ozakawa et al. |
| 5,372,617 | A | 12/1994 | Kerrebrock et al. |
| 5,466,653 | A | 11/1995 | Ma et al. |
| 5,609,990 | A | 3/1997 | Ha et al. |
| 5,650,132 | A | 7/1997 | Murata et al. |
| 5,677,050 | A | 10/1997 | Bilkadi et al. |
| 5,805,190 | A | 9/1998 | Tsuchii et al. |
| 5,840,270 | A | 11/1998 | Werth |
| 5,846,650 | A | 12/1998 | Ko et al. |
| 5,858,541 | A | 1/1999 | Hiraoka et al. |
| 5,948,478 | A | 9/1999 | Lenti et al. |
| 5,962,611 | A | 10/1999 | Meijs et al. |
| 6,007,182 | A | 12/1999 | Matsubara et al. |
| 6,050,674 | A | 4/2000 | Hirabayashi et al. |
| 6,127,498 | A | 10/2000 | Tonelli et al. |
| 6,224,949 | B1 | 5/2001 | Wright et al. |
| 6,238,798 | B1 | 5/2001 | Kang et al. |
| 6,264,320 | B1 | 7/2001 | Moriyama et al. |
| 6,336,430 | B2 | 1/2002 | de Souza et al. |
| 6,364,445 | B1 | 4/2002 | Ikeda et al. |
| 6,387,168 | B1 | 5/2002 | Koitabashi et al. |
| 6,471,347 | B1 | 10/2002 | Koitabashi et al. |
| 6,494,569 | B2 | 12/2002 | Koitabashi et al. |
| 6,540,326 | B2 | 4/2003 | Matsubara et al. |
| 6,544,400 | B2 | 4/2003 | Hockaday et al. |
| 6,582,047 | B2 | 6/2003 | Koitabashi et al. |
| 6,596,363 | B2 | 7/2003 | Hayashida et al. |
| 6,637,876 | B2 | 10/2003 | Hori |
| 6,660,338 | B1 | 12/2003 | Hargreaves |
| 6,846,650 | B2 | 1/2005 | Recipon et al. |
| 6,906,115 | B2 | 6/2005 | Hanazawa et al. |
| 7,037,484 | B1 | 5/2006 | Brandenburg |
| 7,543,899 | B2 | 6/2009 | Konno |
| 7,632,478 | B2 | 12/2009 | Poepken et al. |
| 7,662,984 | B2 | 2/2010 | Nakazawa et al. |
| 7,700,072 | B2 | 4/2010 | Abu-Omar |
| 8,002,954 | B2 | 8/2011 | Popp et al. |
| 8,038,961 | B2 | 10/2011 | Sonnenschein et al. |
| 8,105,564 | B2 | 1/2012 | Sonnenschein et al. |
| 8,221,593 | B2 | 7/2012 | Lang et al. |
| 8,246,925 | B2 | 8/2012 | Schwarz et al. |
| 8,414,863 | B2 | 4/2013 | Pretterebner et al. |
| 8,485,361 | B2 | 7/2013 | Rauleder et al. |
| 9,221,689 | B2 | 12/2015 | Mueh et al. |
| 2001/0010195 | A1 | 8/2001 | Kessler |
| 2001/0030679 | A1 | 10/2001 | Kubota et al. |
| 2002/0001710 | A1 | 1/2002 | Kang et al. |
| 2002/0085284 | A1 | 7/2002 | Nakamura et al. |
| 2002/0111518 | A1 | 8/2002 | Wang et al. |
| 2002/0115820 | A1 | 8/2002 | Wang et al. |
| 2003/0011669 | A1 | 1/2003 | Tsuboi et al. |
| 2003/0012936 | A1 | 1/2003 | Draheim et al. |
| 2003/0218645 | A1 | 11/2003 | Dings et al. |
| 2004/0051862 | A1 | 3/2004 | Alcock et al. |
| 2004/0077775 | A1 | 4/2004 | Audenaert et al. |
| 2004/0125164 | A1 | 7/2004 | Park et al. |
| 2005/0072336 | A1 | 4/2005 | Itoh et al. |
| 2005/0087413 | A1 | 4/2005 | Muller et al. |
| 2005/0087982 | A1 | 4/2005 | Riordan et al. |
| 2005/0106404 | A1 | 5/2005 | Hayashida et al. |
| 2005/0112319 | A1 | 5/2005 | Itoh et al. |
| 2005/0122382 | A1 | 6/2005 | Pickering et al. |
| 2005/0123741 | A1 | 6/2005 | Hayashida et al. |
| 2005/0136252 | A1 | 6/2005 | Chisholm et al. |
| 2005/0158504 | A1 | 7/2005 | Itoh et al. |
| 2005/0158558 | A1 | 7/2005 | Hayashida et al. |
| 2005/0195225 | A1 | 9/2005 | Takagi et al. |
| 2005/0212835 | A1 | 9/2005 | Konno |
| 2005/0288385 | A1 | 12/2005 | Kondo et al. |
| 2006/0013753 | A1 | 1/2006 | Vajo et al. |
| 2006/0084756 | A1 | 4/2006 | Southwell et al. |
| 2006/0216500 | A1 | 9/2006 | Klun et al. |
| 2006/0216524 | A1 * | 9/2006 | Klun ................... C08G 18/289 428/423.1 |
| 2007/0286992 | A1 | 12/2007 | Coggio et al. |
| 2007/0287093 | A1 | 12/2007 | Jing et al. |
| 2008/0095691 | A1 | 4/2008 | Sonnenschein et al. |
| 2008/0101745 | A1 | 5/2008 | Gollier et al. |
| 2008/0122785 | A1 | 5/2008 | Harmon |
| 2008/0261917 | A1 | 10/2008 | Willems et al. |
| 2008/0267859 | A1 | 10/2008 | Abu-Omar |
| 2009/0112013 | A1 | 4/2009 | Nakazawa et al. |
| 2009/0154105 | A1 | 6/2009 | Chu |
| 2009/0155156 | A1 | 6/2009 | Sonnenschein et al. |
| 2009/0208407 | A1 | 8/2009 | Pretterebner et al. |
| 2009/0225726 | A1 | 9/2009 | Hanaki et al. |
| 2010/0080746 | A1 | 4/2010 | Lang et al. |
| 2010/0266489 | A1 | 10/2010 | Rauleder et al. |
| 2010/0278706 | A1 | 11/2010 | Mueh et al. |
| 2010/0296994 | A1 | 11/2010 | Rauleder et al. |
| 2010/0304595 | A1 | 12/2010 | Wang |
| 2011/0052474 | A1 | 3/2011 | Mueh et al. |
| 2011/0150739 | A1 | 6/2011 | Seliger et al. |
| 2012/0177557 | A1 | 7/2012 | Rauleder et al. |
| 2012/0183464 | A1 | 7/2012 | Mueh et al. |
| 2012/0195804 | A1 | 8/2012 | Lang et al. |
| 2012/0214005 | A1 | 8/2012 | Wieber et al. |
| 2013/0043893 | A1 | 2/2013 | Mueh et al. |
| 2013/0323151 | A1 | 12/2013 | Mueh et al. |

FOREIGN PATENT DOCUMENTS

| | | | | |
|---|---|---|---|---|
| CN | 101466463 | A | 6/2009 | |
| CN | 101851540 | A | 10/2010 | |
| CN | 102030313 | A | 4/2011 | |
| CN | 102180445 | A | 9/2011 | |
| CN | 102838085 | A | 12/2012 | |
| CN | 103025650 | A * | 4/2013 | ............... C01B 3/06 |
| CN | 102838085 | B | 4/2014 | |
| DE | 2507864 | A1 | 8/1975 | |
| DE | 3000802 | A1 | 7/1981 | |
| DE | 3016807 | A1 | 11/1981 | |
| DE | 69724358 | T2 | 7/2004 | |
| DE | 60108744 | T2 | 3/2006 | |
| DE | 102006030798 | A1 | 1/2008 | |
| DE | 102006034885 | A1 | 8/2008 | |
| DE | 102007059170 | A1 | 6/2009 | |
| DE | 102011004058 | A1 | 8/2012 | |
| EP | 471139 | A2 | 2/1992 | |
| EP | 671487 | A1 | 9/1995 | |
| EP | 2206679 | A1 | 7/2010 | |
| GB | 745698 | A | 2/1956 | |
| GB | 826575 | A | 1/1960 | |
| GB | 885117 | A | 12/1961 | |
| GB | 1038193 | A | 8/1966 | |

(56) References Cited

FOREIGN PATENT DOCUMENTS

| | | |
|---|---|---|
| JP | S48-7246 A | 1/1973 |
| JP | S51-138617 A | 11/1976 |
| JP | S52-156810 A | 12/1977 |
| JP | S59-45901 A | 3/1984 |
| JP | S61-138540 A | 6/1986 |
| JP | S63-77835 A | 4/1988 |
| JP | S63-303807 A | 12/1988 |
| JP | H02-4733 A | 1/1990 |
| JP | H04-159246 A | 6/1992 |
| JP | H06-87222 A | 3/1994 |
| JP | H06-256526 A | 9/1994 |
| JP | H08-72227 A | 3/1996 |
| JP | H08-281931 A | 10/1996 |
| JP | H082-81934 A | 10/1996 |
| JP | H09-118008 A | 5/1997 |
| JP | H09-300665 A | 11/1997 |
| JP | 2001-105581 A | 4/2001 |
| JP | 2001-511429 A | 8/2001 |
| JP | 2001-323195 A | 11/2001 |
| JP | 2002-210947 A | 7/2002 |
| JP | 2002-321349 A | 11/2002 |
| JP | 2004-51 4632 A | 5/2004 |
| JP | 2005-504695 A | 2/2005 |
| JP | 2005-306025 A | 11/2005 |
| JP | 2006-510719 A | 3/2006 |
| JP | 2006-273644 A | 10/2006 |
| JP | 2007-282965 A | 11/2007 |
| JP | 2008-513325 A | 5/2008 |
| JP | 2009-509901 A | 3/2009 |
| JP | 2009-107982 A | 5/2009 |
| JP | 2009-545842 A | 12/2009 |
| JP | 2010-083887 A | 4/2010 |
| JP | 2010-248067 A | 11/2010 |
| JP | 5360736 B2 | 12/2013 |
| JP | 2014-508705 A | 4/2014 |
| JP | 5521463 B2 | 6/2014 |
| JP | 5855137 B2 | 2/2016 |
| RU | 2009 101 932 A | 8/2010 |
| WO | 01/85606 A1 | 11/2001 |
| WO | 02/090257 A1 | 11/2002 |
| WO | 2005/037421 A2 | 4/2005 |
| WO | 2007/019172 A2 | 2/2007 |
| WO | 2007/039326 A1 | 4/2007 |
| WO | 2008/012078 A2 | 1/2008 |
| WO | 2008/026707 A1 | 3/2008 |
| WO | 2008/094840 A3 | 8/2008 |
| WO | WO 2008/094840 A2 * | 8/2008 |
| WO | 2009/023535 A2 | 2/2009 |
| WO | 2010/038902 A1 | 4/2010 |
| WO | 2010070001 | 6/2010 |
| WO | 2010094785 | 8/2010 |
| WO | 2011/006695 A1 | 1/2011 |
| WO | 2011/006697 A1 | 1/2011 |
| WO | 2011098614 | 8/2011 |
| WO | 2012/062526 A1 | 5/2012 |
| WO | 2012/062560 A2 | 5/2012 |
| WO | 2012/062562 A2 | 5/2012 |
| WO | 2012/110275 A1 | 8/2012 |
| WO | 2012/139807 A1 | 10/2012 |

OTHER PUBLICATIONS

Iwao Ojima, "The Hydrosilylation Reaction", "Organic Silicon Compounds (1989), vol. 1", p. 1479-1526, Jan. 15, 1989 (Jan. 15, 1989), John Wiley & Sons, Ltd, XP055581608.

Kazumasa Hayasaka et al, "Dehydrogenative desulfurization of thiourea derivatives to give carbodiimides, using hydrosilane and an iron complex", Dalton Transactions, vol. 42, No. 28, May 10, 2013 (May 10, 2013), p. 10271, XP055581577.

Won-Sik Han et al., "Silane-based hydrogen storage materials for fuel cell application: Hydrogen release via methanolysis and regeneration by hydride reduction from organosilanes", Jun. 22, 2011 (Jun. 22, 2011), vol. 36, No. 19, p. 12305-12312, XP028292175.

Boreskov G.K., "Heterogeneous analysis", Moscow: Nauka, 1986, p. 5 and 15.

Dalton Transactions; [6015A], Jan. 1, 2013 RSC—Royal Society of Chemistry, Cambridge / vol. 42, Nr:28, p. 10271.

International Journal of Hydrogen Energy, Jun. 22, 2011 Elsevier, Amsterdam, NL / vol. 36, Nr: 19, p. 12305-12312, Abstract.

Kolesnikov I.M. et al., "Solid catalysts, their structure, composition and catalytic activity" [in Russian], Moscow: State Unitary Enterprise Publishing House "Oil and Gas" Russian State University of Oil and Gas named after Gubkin I. M., 2000, p. 10).

Organic Silicon Compounds (1989), vol. 1, Jan. 15, 1989 John Wiley & Sons, Ltd / pp. 1479-1480.

* cited by examiner

CATALYSED PROCESS OF PRODUCTION OF HYDROGEN FROM SILYLATED DERIVATIVES AS HYDROGEN CARRIER COMPOUNDS

FIELD OF THE INVENTION

The present invention relates to a catalysed process of production of hydrogen from silylated derivatives as hydrogen carrier compounds. The present invention also relates to a new hydrogen release catalyst used in the catalysed process of production of hydrogen from silylated derivatives as hydrogen carrier compounds.

BACKGROUND

The ability to store, transport and release hydrogen in a safe, convenient, and environment-friendly manner source and to produce and store hydrogen efficiently, economically and safely, are main challenges to be overcome in order to democratize the use of hydrogen as an energy vector.

Currently hydrogen is mainly delivered either by pipeline, by tube trailers as a compressed gas or by special tankers in its liquefied form.

There are typically six routes for hydrogen delivery: it can be transported as a gas by pipeline, it can be produced on site, it can be transported as a compressed gas in tube trailers, it can be transported as a condensed liquid in cryogenic trucks, it can be stored in a solid-state hydrogen carrier material and released on-site, and stored in a liquid-state hydrogen carrier material and released on-site.

Hydrogen can be produced on-site by two means. It can be produced on site by one process and directly consumed in another process which is defined as captive hydrogen. The other mean of on-site production is by water electrolysis, which produces hydrogen from water and electricity. It can be considered producing an environment-friendly hydrogen if powered by renewable energy.

In addition to incumbent delivery solutions which are cryogenic and compressed hydrogen, alternative solutions are emerging to provide hydrogen: hydrogen carriers. Hydrogen carriers are either solid-state or liquid-state materials that have the ability to store hydrogen and release it when needed. They bring advantages either for transport or storage, compared to incumbent solutions. Solid-state carriers include metallic hydrides enabling the uptake of hydrogen, by adsorption onto metal particles resulting in metal hydride. Among them, the magnesium hydride is stable at low pressure and standard temperature, making it convenient to transport and store. When needed, the material is heated to release the hydrogen gas. Solid-state solutions have been identified as best suited for same-site reversible processes of energy storage from renewable energies. Indeed, handling solid materials is not as convenient as handling gas or liquid ones.

Liquid hydrogen carriers can be any liquid-state material able to release hydrogen under specific conditions. The class of Liquid Organic Hydrogen Carriers (LOHC) is the most represented among the liquid hydrogen carriers. During the process called hydrogenation, which is a catalytic reaction, requiring energy in the form of heat, hydrogen is chemically bonded to the liquid organic carrier. Typically the carrier, being unsaturated or aromatic hydrocarbons such as toluene, is reacted with hydrogen to produce the corresponding saturated hydrocarbon, to be transported in a liquid-state at standard temperature and pressure. Although the amount of hydrogen to be stored in LOHC depends on the yield of the hydrogenation process it is up to 7.2% mass of hydrogen contained per mass of liquid carrier. Then the hydrogen is released from the saturated hydrocarbons by a process called dehydrogenation, which is a catalytic reaction, requiring additional energy in the form of heat. In order to produce on-demand hydrogen, heat may be produced from grid electricity (without control on its origin and on its impact on the environment) or heat may be retrieved by burning a part of the organic carrier.

Patent applications WO2010070001 (A1) and EP2206679 (A1) relate to a method for producing hydrogen comprising the steps consisting in: a) reacting a compound (C) comprising one or more groups Si—H with a fluoride ions source, thereby forming hydrogen and a by-product (C1); and b) recovering the obtained hydrogen.

Patent application WO2011098614 (A1) relates to a method for producing hydrogen comprising the steps of: i) contacting a compound (C) comprising one or more groups Si—H with a phosphorous based catalyst in the presence of a base in water as solvent, thereby forming hydrogen and a by-product (C1); and ii) recovering the obtained hydrogen.

Patent application WO2010094785 (A1) relates to a method for producing hydrogen comprising the steps of: i) contacting a compound (C) comprising one or more groups Si—H with an amine based catalyst in a solvent selected from an alcohol or an aqueous solution, thereby forming hydrogen and a by-product (C1); and ii) recovering the obtained hydrogen.

Whilst both WO2011098614 (A1) and WO2010094785 (A1) already represent a breakthrough in the field of hydrogen-based carrier system that releases hydrogen on-demand, said techniques would still benefit from improved efficiency, performance, and cost effectiveness.

Thus, there remains a need for further improvements in efficiency, performance, and cost effectiveness of such clean energy vectors, for a variety of applications, such as hydrogen delivery and hydrogen infrastructure building. There remains a need for improvements which exhibit greater amounts of hydrogen to be transported, enhanced efficiency, performance and that are cost effective. There remains a critical need for environment-friendly liquid-state hydrogen carriers that are able to release on-demand hydrogen without the need for additional energy. In addition, there remains a need for an integrated clean process wherein hydrogen carriers can not only be used as a valuable hydrogen source but also be produced without requiring carbon containing reactant and/or without carbon emissions, and also be regenerated from the by-products of the hydrogen separation environmentally friendly and without substantial carbon emissions, preferably without carbon emissions.

DETAILED DESCRIPTION

It now has been discovered that by using a new catalyst, hydrogen can be produced in large amounts, with high yields, in a very short time and with very low production costs. Further, this method can be easily scaled up.

Method for Producing Hydrogen

Thus, in one aspect, the invention is directed to a method for producing hydrogen comprising the steps consisting in contacting a hydrogen carrier compound (C) comprising one or more Si—H bonds with a hydrogen release catalyst Y and an optional hydrogen release catalyst X (different from catalyst Y) wherein the hydrogen release catalyst Y is selected from formula Wherein Y is O or S, and X1, X2, are each independently selected from halogen, C1-C10 alkyl, C3-C10 cycloalkyl, C6-C12 aryl, C6-C12 aralkyl, 5 to 10-membered heteroaryl, OR³, SiR⁶R⁷R⁸, wherein said alkyl and aryl groups are optionally substituted by one to three R⁹ groups Or X1 and X2=—CR$^a$R$^b$ form together with the carbon atom to which they are attached a 3 to 10-membered cycloalkyl, optionally substituted by one to three R⁹ groups and R$^a$, R$^b$ are each independently selected from H, halogen, C1-C10 alkyl, C3-C10 cycloalkyl, C6-C12 aryl, C6-C12 aralkyl, 5 to 10-membered heteroaryl, OR¹⁰, wherein said alkyl and aryl groups are optionally substituted by one to three R⁹ groups Or X1 and X2=NR$^a$R$^b$ with R$^a$ and R$^b$, each independently selected from H, halogen, C1-C10 alkyl, C3-C10 cycloalkyl, C6-C12 aryl, C6-C12 aralkyl, 5 to 10-membered heteroaryl, OR¹⁰, wherein said alkyl and aryl groups are optionally substituted by one to three R⁹ groups X1 is selected from halogen, C1-C10 alkyl, C3-C10 cycloalkyl, C6-C12 aryl, C6-C12 aralkyl, 5 to 10-membered heteroaryl, OR³, SiR⁶R⁷R⁸ and X2=NR$^a$R$^b$ with R$^a$ and R$^b$, each independently selected from H, halogen, C1-C10 alkyl, C3-C10 cycloalkyl, C6-C12 aryl, C6-C12 aralkyl, 5 to 10-membered heteroaryl, OR¹⁰, wherein said alkyl and aryl groups are optionally substituted by one to three R⁹ groups Or X1 and X2=NR$^c$ form together with the carbon atom to which they are attached a 3 to 10-membered heterocycloalkyl, optionally substituted by one to three R⁹ groups and R$^c$ is selected from H, halogen, C1-C10 alkyl, C3-C10 cycloalkyl, C6-C12 aryl, C6-C12 aralkyl, 5 to 10-membered heteroaryl, OR¹⁰, wherein said alkyl and aryl groups are optionally substituted by one to three R⁹ groups Or X1=—CR$^a$R$^b$ with R$^a$, R$^b$ are each independently selected from H, halogen, C1-C10 alkyl, C3-C10 cycloalkyl, C6-C12 aryl, C6-C12 aralkyl, 5 to 10-membered heteroaryl, OR¹⁰ and X2=NR$^c$ form together with the carbon atom to which they are attached a 3 to 10-membered heterocycloalkyl, optionally substituted by one to three R⁹ groups with R$^c$ selected from H, halogen, C1-C10 alkyl, C3-C10 cycloalkyl, C6-C12 aryl, aralkyl, 5 to 10-membered heteroaryl, OR¹⁰, wherein said alkyl and aryl groups are optionally substituted by one to three R⁹ groups wherein R³ is H, C1-C6 alkyl, C6-C10 aryl, C6-C12 aralkyl;

R⁶, R⁷, R⁸ are each independently selected from H, OR³, C1-C6 alkyl, C6-C10 aryl, C6-C12 aralkyl;

R⁹ is selected from halogen, C1-C10 alkyl, C3-C10 cycloalkyl, C6-C12 aryl, C6-C12 aralkyl, 5 to 10-membered heteroaryl, OR¹⁰, NO₂, NR¹¹R¹², CN, C(=O)R¹⁰, C(=O)OR¹⁰, S(=O)CH₃, wherein said alkyl and aryl groups are optionally substituted by one or more halogen or C1-C10 alkyl or OR³;

R¹⁰ is H, C1-C6 alkyl, C6-C10 aryl, C6-C12 aralkyl; and

R¹¹, R¹² are each independently selected from H, or C1-C10 alkyl. and wherein the ratio between the sum of the moles of hydrogen release catalyst Y and the moles of the optional hydrogen release catalyst X relative to the moles of the hydrogen carrier compound (C) multiplied by the number of [Si—H] bonds of compound (C) is inferior or equal to 0.3, for example ranges from 0.005 to 0.3, preferably from 0.01 to 0.1, more preferably lower than 0.05, e.g. equal to 0.03, and/or wherein the ratio between the sum of the mass of hydrogen release catalyst Y and the mass of the optional hydrogen release catalyst X relative to the mass of the hydrogen carrier compound (C) is inferior or equal to 0.2, preferably comprised between 0.01 and 0.2, more preferably comprised between 0.02 and 0.07.

Whilst not wishing to be bound by this theory, the Applicants believe that it is critical to maintain the amount/moles of hydrogen release catalyst Y (and optional hydrogen release catalyst X) below the claimed ratio levels; indeed, the Applicants have discovered that the effect the hydrogen release catalyst(s) could be reversed when used at higher ratios catalyst/compound (C) ratios, i.e. transforming the catalyst into a kind of inhibitor.

In an embodiment of the present invention, the catalyst Y is selected from above formula wherein Y is O and X1 and X2 are as above.

In an embodiment of the present invention, the catalyst Y is selected from above formula wherein X1 is —NR$^a$R$^b$ and X2 and Y are as above; Y is preferably O.

In an embodiment of the present invention, the catalyst Y is selected from above formula wherein X1 and X2 are both selected from —NR$^a$R$^b$ and Y is O or S; Y is preferably O.

In a particular embodiment of the present invention, the catalyst Y is selected from 1,3-dimethyl-3,4,5,6-tetrahydro-2(1H)-pyrimidinone (DMPU), tetramethylurea, urea, N,N-dimethylacetamide, cyclohexanone, or mixtures thereof; DMPU and tetramethylurea being particularly preferred.

In an embodiment of the invention the catalyst Y is supported; for example, it can advantageously be supported on an inorganic or polymeric support, for example a functionalized polystyrene resin, or poly(styrene-divinylbenzene) matrix such as DOWEX resins.

Hydrogen Release Catalyst Y

In an embodiment of the present invention, the invention is directed to a hydrogen release catalyst Y, which can be used in the method for producing hydrogen when a hydrogen carrier compound (C) comprising one or more Si—H bonds is contacted with said catalyst, which is selected from formula Wherein Y is O or S, and
- X1, X2, are each independently selected from halogen, C1-C10 alkyl, C3-C10 cycloalkyl, C6-C12 aryl, C6-C12 aralkyl, 5 to 10-membered heteroaryl, $OR^3$, $SiR^6R^7R^8$, wherein said alkyl and aryl groups are optionally substituted by one to three $R^9$ groups Or
- X1 and X2=—$CR^aR^b$ form together with the carbon atom to which they are attached a 3 to 10-membered cycloalkyl, optionally substituted by one to three $R^9$ groups and $R^a$, $R^b$ are each independently selected from H, halogen, C1-C10 alkyl, C3-C10 cycloalkyl, C6-C12 aryl, C6-C12 aralkyl, 5 to 10-membered heteroaryl, $OR^{10}$, wherein said alkyl and aryl groups are optionally substituted by one to three $R^9$ groups

Or
- X1 and X2=$NR^aR^b$ with $R^a$ and $R^b$, each independently selected from H, halogen, C1-C10 alkyl, C3-C10 cycloalkyl, C6-C12 aryl, C6-C12 aralkyl, 5 to 10-membered heteroaryl, $OR^{10}$, wherein said alkyl and aryl groups are optionally substituted by one to three $R^9$ groups
- X1 is selected from halogen, C1-C10 alkyl, C3-C10 cycloalkyl, C6-C12 aryl, C6-C12 aralkyl, 5 to 10-membered heteroaryl, $OR^3$, $SiR^6R^7R^8$ and X2=$NR^aR^b$ with $R^a$ and $R^b$, each independently selected from H, halogen, C1-C10 alkyl, C3-C10 cycloalkyl, C6-C12 aryl, C6-C12 aralkyl, 5 to 10-membered heteroaryl, $OR^{10}$, wherein said alkyl and aryl groups are optionally substituted by one to three $R^9$ groups
- X1 and X2=form together with the carbon atom to which they are attached a 3 to 10-membered heterocycloalkyl, optionally substituted by one to three $R^9$ groups and $R^c$ is selected from H, halogen, C1-C10 alkyl, C3-C10 cycloalkyl, C6-C12 aryl, C6-C12 aralkyl, 5 to 10-membered heteroaryl, $OR^{10}$, wherein said alkyl and aryl groups are optionally substituted by one to three $R^9$ groups Or
- X1=—$CR^aR^b$ with $R^a$, $R^b$ are each independently selected from H, halogen, C1-C10 alkyl, C3-C10 cycloalkyl, C6-C12 aryl, C6-C12 aralkyl, 5 to 10-membered heteroaryl, $OR^{10}$ and X2=$NR^c$ form together with the carbon atom to which they are attached a 3 to 10-membered heterocycloalkyl, optionally substituted by one to three $R^9$ groups with $R^c$ selected from H, halogen, C1-C10 alkyl, C3-C10 cycloalkyl, C6-C12 aryl, aralkyl, 5 to 10-membered heteroaryl, Ole, wherein said alkyl and aryl groups are optionally substituted by one to three $R^9$ groups wherein
$R^3$ is H, C1-C6 alkyl, C6-C10 aryl, C6-C12 aralkyl;

$R^6$, $R^7$, $R^8$ are each independently selected from H, $OR^3$, C1-C6 alkyl, C6-C10 aryl, C6-C12 aralkyl;
$R^9$ is selected from halogen, C1-C10 alkyl, C3-C10 cycloalkyl, C6-C12 aryl, C6-C12 aralkyl, 5 to 10-membered heteroaryl, $OR^{10}$, $NO_2$, $NR^{11}R^{12}$, CN, C(=O)$R^{10}$, C(=O)$OR^{10}$, S(=O)$CH_3$, wherein said alkyl and aryl groups are optionally substituted by one or more halogen or C1-C10 alkyl or $OR^3$
$R^{10}$ is H, C1-C6 alkyl, C6-C10 aryl, C6-C12 aralkyl; $R^{11}$, $R^{12}$ are each independently selected from H, or C1-C10 alkyl.

In an embodiment of the present invention, the hydrogen release catalyst Y is selected from above formula wherein Y is O and X1 and X2 are as above,

In an embodiment of the present invention, the hydrogen release catalyst Y is selected from above formula wherein X1 is —$NR^aR^b$ and X2 and Y are as above; Y is preferably O.

In an embodiment of the present invention, the hydrogen release catalyst Y is selected from above formula wherein X1 and X2 are both selected from —$NR^aR^b$ and Y is O or S; Y is preferably O.

In a particular embodiment of the present invention, the hydrogen release catalyst Y is selected from 1,3-dimethyl-3,4,5,6-tetrahydro-2(1H)-pyrimidinone (DMPU), tetramethylurea, N,N-dimethylacetamide, cyclohexanone, or mixtures thereof; DMPU and tetramethylurea being particularly preferred.

In an embodiment of the invention the hydrogen release catalyst Y is supported; for example, it can advantageously be supported on an inorganic or polymeric support, for example a functionalized polystyrene resin, or poly(styrene-divinylbenzene) matrix such as DOWEX resins.

In a preferred embodiment of the present invention, as the claimed hydrogen release catalyst Y favours the cleavage of the Si—H bond when used in the method for producing hydrogen during the contact with a hydrogen carrier compound (C) comprising one or more Si—H bonds, said catalyst is preferably a hydrogen release and Si—H bond cleavage catalyst.

In an embodiment of the present invention, the claimed hydrogen release catalyst Y is a nucleophile; for example, said nucleophile coordinates to the (or one) Si atom of compound (C) to form a pentacoordinate intermediate in which the (one) Si—H bond is weakened and thus more prone to react with a proton source to liberate a $H_2$ fragment.

In an embodiment of the present invention, the claimed hydrogen release catalyst Y is a phase transfer agent; for example, it favours the contact between the lipophilic compound (C) and the aqueous phase containing for instance a hydrogen release initiator.

In a preferred embodiment of the present invention, the claimed hydrogen release catalyst Y is a nucleophile and a phase transfer agent.

Hydrogen Carrier Compound (C) Comprising One or More Si—H Bonds

In an embodiment of the present invention, the hydrogen carrier compound (C) comprises at least one Si—H bond, for example at least two Si—H bonds.

In an embodiment of the present invention, the hydrogen carrier compound (C) comprises one or more monomer unit of formulae:

wherein
R is a bond, $C_1$-$C_6$ alkylene or $(C_1$-$C_4$ alkylene)q-Z-$(C_1$-$C_4$ alkylene)r;
Z is O, $NR^{10}$, $S(O)_y$, $CR^{10}$=$CR^{10}$, C≡C, C6-C10 arylene, 5-10 membered heteroarylene, or C3-C6 cycloalkylene;
$R^1$, $R^2$ are each independently selected from H, halogen, C1-C10 alkyl, C3-C10 cycloalkyl, C6-C12 aryl, aralkyl, 5 to 10-membered heteroaryl, $OR^3$, $NR^4R^5$, $SiR^6R^7R^8$, wherein said aryl groups are optionally substituted by one to three $R^9$ groups;
$R^{1'}$, $R^{2'}$ are each independently selected from H, halogen, C1-C10 alkyl, C3-C10 cycloalkyl, C6-C12 aryl, aralkyl, 5 to 10-membered heteroaryl, $OR^3$, $NR^4R^5$, $SiR^6R^7R^8$, wherein said aryl groups are optionally substituted by one to three $R^9$ groups;
$R^3$ is H, C1-C6 alkyl, C6-C10 aryl, C6-C12 aralkyl;
$R^4$, $R^5$ are each independently selected from H, C1-C6 alkyl, C6-C10 aryl, C6-C12 aralkyl;
$R^6$, $R^7$, $R^8$ are each independently selected from H, $OR^3$, C1-C6 alkyl, C6-C10 aryl, C6-C12 aralkyl, $SiH_3$;
$R^9$ is selected from halogen, C1-C10 alkyl, $OR^{10}$, $NO_2$, $NR^{11}R^{12}$, CN, C(=O)$R^{10}$, C(=O)O$R^{10}$, S(=O)$CH_3$, wherein said alkyl group is optionally substituted by one or more halogen;
$R^{10}$ is H, or C1-C3 alkyl;
$R^{11}$, $R^{12}$ are each independently selected from H, or C1-C10 alkyl;
q, r are 0 or 1;
y is 0, 1 or 2;
m, n and p are integers representing the number of repeating units, with n being superior or equal to 1, p being 0 or 1 and m being 0 or 1;
A, B are each independently selected from H, halogen, C1-C10 alkyl, C3-C10 cycloalkyl, C6-C12 aryl, C6-C12 aralkyl, 5 to 10-membered heteroaryl, $OR^3$, $OSiR^6R^7R^8$, $NR^4R^5$, $SiR^6R^7R^8$, $CR^{13}R^{14}R^{15}$ wherein said aryl groups are optionally substituted by one to three $R^9$ groups;

$R^{13}$, $R^{14}$, $R^{15}$ are each independently selected from H, halogen, C1-C10 alkyl, C3-C10 cycloalkyl, C6-C12 aryl, C6-C12 aralkyl, 5 to 10-membered heteroaryl, $OR^3$, $NR^4R^5$, $SiR^6R^7R^8$; and
wherein the compound (C) comprises at east one Si—H bond, for example at least two Si—H bonds.

In an embodiment of the present invention, the hydrogen carrier compound (C) comprises one or more monomer unit of above formulae:

wherein p=0 and m=1.

In an embodiment of the present invention, the hydrogen carrier compound (C) comprises one or more monomer unit of above formulae:

wherein $R^1$=Me (methyl group) or H, $R^{1'}$ is H, and preferably wherein p=0 and m=1.

In an embodiment of the present invention, the hydrogen carrier compound (C) comprises one or more monomer unit of above formulae:

wherein $R^1$ is Me and n is superior to 1 and inferior to 15 000; preferably inferior to 1000; for example between 20 and 500. In a preferred embodiment, A=$SiMe_3$, Me or $SiH_3$ and B=OMe, $OSiMe_3$ or $OSiH_3$

In an embodiment of the present invention, the hydrogen carrier compound (C) is a Polyhydromethylsiloxane.

In an embodiment of the present invention, the hydrogen carrier compound (C) comprises one or more monomer unit of formulae wherein preferably, $R^1$ is H and n is superior to 1. In a corresponding preferred embodiment of the present invention, n is superior or equal to 1, $R^1$ is H and A=SiMe$_3$, Me or SiH$_3$ and B=OMe, OSiMe$_3$ or OSiH$_3$.

In an embodiment of the present invention, the hydrogen carrier compound (C) comprises one or more monomer unit of formulae wherein n is preferably inferior to 500.

In an embodiment of the present invention, the hydrogen carrier compound (C) comprises one or more monomer unit of above formulae:

Wherein m=p=0, $R^1$ and $R^{1'}$ are H and n is superior to 1 and inferior to 1 000; preferably inferior to 100; for example between 1 and 20. In a preferred embodiment, A=B=SiMe$_3$, Me or SiH$_3$, preferably SiH$_3$.

In another embodiment of the present invention, the hydrogen carrier compound (C) comprises one or more monomer unit of formula wherein n is comprised between 1 and 30, preferably between 2 and 20.

In an embodiment of the present invention, the hydrogen carrier compound (C) comprises one or more monomer unit of above formulae:

Wherein m=p=0, $R^1$ and $R^{1'}$ are —SiR$_3$ with R=H or SiH$_3$ and n is superior to 1 and inferior to 1 000; preferably inferior to 100; for example between 1 and 10. In a preferred embodiment, A=B=SiMe$_3$, Me or SiH$_3$, preferably SiH$_3$.

In another embodiment of the present invention, the hydrogen carrier compound (C) comprises one or more monomer unit of formula wherein n is comprised between 2 and 10, preferably between 2 and 4.

In a still further embodiment of the present invention, the hydrogen carrier compound (C) is cyclic. In said embodiment, n is superior or equal to 2, preferably superior or equal to 3, for example superior or equal to 4, e.g. a polysilane or a polysiloxane; this number of repeating units n is usually inferior or equal to 500; in a preferred corresponding embodiment, n is an integer superior or equal to 4 and inferior or equal to 32.

In another embodiment of the present invention, the hydrogen carrier compounds (C) consist in a mixture of two or more of any of the above defined silane and/or siloxane hydrogen carrier compounds, i.e. a mixture of linear compounds, a mixture of cyclic compounds and/or a blend of linear and cyclic compounds.

As already indicated hereabove, the Applicants believe that it is critical to maintain the amount/moles of hydrogen release catalyst Y (and optional hydrogen release catalyst X) below the above claimed ratio(s). When the number of repeating Si units (for example H$_2$Si or H$_2$SiO) of a hydrogen carrier compound (C) is superior or equal to 4, i.e. when the corresponding hydrogen carrier compound (C) might be considered as a polymer, the present invention also provides the man in the art with an alternative calculation as explained hereafter. Indeed, in another and alternative embodiment which is particularly applicable when hydrogen carrier compound (C) is a polymer exhibiting 4 or more repeating Si units, the above ratio can be replaced by another ratio between the same sum {of the moles of hydrogen release catalyst Y and the moles of the optional hydrogen release catalyst X} relative to sum {of the moles of repeating Si units of the polymer multiplied by the number of Si—H bonds per repeating unit and the moles of chain end multiplied by the number of Si—H bonds of its corresponding chain end}, said ratio ranging from 0.005 to 0.3, preferably from 0.01 to 0.1.

For example, for a polymer of structure A—(X)$_n$—A and of average molecular weight (Mn) in g/mol, the calculation is [polymer]×(2×y+η×z)=(m$_{polymer}$/Mn)×(2×y+η×z), with [polymer] the amount in mol of polymer chains, y the number of Si—H bond per chain end, z the number of Si—H bond per repeating unit and η the average number of repeating unit per polymer chain.

Thus, in another aspect of the present invention, there is provided a method for producing hydrogen comprising the steps consisting in contacting a hydrogen carrier compound (C) comprising one or more Si—H bonds with a hydrogen release catalyst Y and an optional hydrogen release catalyst X (different from catalyst Y) wherein the hydrogen release catalyst Y is selected from formula with Y, X1 and X2 as hereinabove defined, and wherein the ratio between the sum {of the moles of hydrogen release catalyst Y and the moles of the optional hydrogen release catalyst X} relative to sum {of the moles of repeating units of the polymer multiplied by the number of Si—H bonds per repeating unit and the moles of chain ends multiplied by the number of Si—H bonds of its corresponding chain end}, ranges from 0.005 to 0.3, preferably from 0.01 to 0.1.

Siloxane Hydrogen Carrier Compounds

In an embodiment of the present invention, the hydrogen carrier compounds (C) are siloxane hydrogen carrier compounds comprising one or more units of formula (I):

formula (I)

wherein n is an integer (representing the number of repeating units) superior or equal to one, preferably superior or equal to 2, for example superior or equal to 3, or even superior or equal to four. In an embodiment of the present invention, n is inferior or equal to 500, for example inferior or equal to 50. In an embodiment of the present invention, n is superior or equal to 4 and inferior or equal to 32.

In an embodiment according to the present invention, the siloxane hydrogen carrier compounds of formula (I) present a cyclic or a linear chemical structure.

In an embodiment of the present invention, the siloxane hydrogen carrier compound of formula (I) is a linear compound, for example a linear compound of formula $ROH_{2n}Si_nO_nR'$ with n being an integer superior or equal to 1, preferably superior or equal to 2, for example superior or equal to 3, or even superior or equal to four, R and R' can advantageously be selected amongst A and B as hereinabove defined, H, Me, Et, Pr, $^i$Pr, Bu, $^t$Bu, Ph, $SiH_3$, $SiMe_3$, $SiMe_2H$, $SiMeH_2$, $SiEt_3$, and $SiPh_3$, preferably Me, $SiMe_3$ or $SiH_3$. In an embodiment of the present invention, n is inferior or equal to 500, for example inferior or equal to 20.

In an embodiment according to the present invention, the hydrogen carrier compounds (C) (for example the siloxane hydrogen carrier compounds) don't contain carbon atoms. However, for the purpose of the present invention and appended claims, and in order to prevent an undue restriction of the scope of the present invention, the Applicants have used the expression "without substantial carbon emissions" to tolerate some carbon emissions; for example, the hydrogen carrier compounds (C) of the present invention may comprise carbon as long as the corresponding carbon content of said compounds (C) is lower than 25 wt %. The said carbon content can be calculated by performing the ratio between the molecular weight (in g/mol) of all the carbon atoms contained in the hydrogen carrier compound (C) and the total molecular weight (in g/mol) of the hydrogen carrier compound (C). In an embodiment according to the present invention, the carbon content is lower than 10 wt %, preferably lower than 5 wt %©, for example lower to 2 wt %©, or even more preferably equal to 0 wt %.

In a preferred embodiment according to the present invention, when the hydrogen carrier compounds (C) (for example the above silane and/or siloxane hydrogen carrier compounds) are carbon free, there is no carbon emissions, and when the hydrogen carrier compounds (C) (for example the above silane and/or siloxane hydrogen carrier compounds) contain carbon, the corresponding carbon emissions would be less than 0.924 kg of $CO_2$ per kg of produced and/or recycled compound (C) (for example the above silane and/or siloxane hydrogen carrier compound), preferably less than 0.462, more preferably less than 0.231, for example less than 0.1 or even less than 0.05 kg of $CO_2$.

In a preferred embodiment of the present invention, the hydrogen carrier compound (C) (for example the above silane and/or siloxane hydrogen carrier compound of formula (I)) is a cyclic compound, for example a cyclic compound of formula $H_{2n}Si_n$ or $H_{2n}Si_nO_n$ with n being an integer superior or equal to 2, for example superior or equal to 3, or even superior or equal to four. In an embodiment of the present invention, n is inferior or equal to 500, for example inferior or equal to 32. In an embodiment of the present invention, n is superior or equal to 4 and inferior or equal to 32.

In a still further embodiment of the present invention, the hydrogen carrier compound (C) of formula (I) is cyclic.

In an embodiment of the present invention, the hydrogen carrier compound (C) is represented by the following formula (II)

wherein n is an integer (representing the number of repeating units) superior or equal to one, preferably superior or equal to 2, for example superior or equal to 3, or even superior or equal to four. In an embodiment of the present invention, in formula (II), n is inferior or equal to 32, for example inferior or equal to 17. In an embodiment of the present invention, in formula (II), n is superior or equal to 2 and inferior or equal to 17.

In an embodiment of the present invention, the siloxane hydrogen carrier compounds (C) consist in one of the above defined siloxane hydrogen carrier compounds of formula (I) or of formula (II).

In another embodiment of the present invention, the siloxane hydrogen carrier compounds (C) consist in a mixture of two or more of any of the above defined siloxane hydrogen carrier compounds of formula (I) or of formula (II).

In an embodiment, the mixture consists in a mixture of two or more of
  any of the above defined cyclic siloxane hydrogen carrier compounds of formula (I) or of formula (II); or
  any of the above defined linear siloxane hydrogen carrier compounds of formula (I).

In an embodiment, the mixture consists in a blend of one or more of the above defined cyclic siloxane hydrogen carrier compounds of formula (I) and/or of formula (II) together with one or more of the above defined linear siloxane hydrogen carrier compounds of formula (I). In this blend "mixture" embodiment, when linear siloxane hydrogen carrier compounds of formula (I) represent the main species in weight in the mixture (i.e. represent more than 50 percent by weight), it is advantageous to restrict the amount of cyclic siloxane hydrogen carrier compounds to less than 20 percent by weight, for example less than 10 percent by weight in the mixture; in an embodiment, more than 0.01 percent by weight, or even more than 0.1 percent by weight of cyclic siloxane hydrogen carrier compounds can advantageously be present in said mixture.

In this blend "mixture" embodiment, when cyclic siloxane hydrogen carrier compounds represent the main species in weight in the mixture (i.e. represent more than 50 percent by weight), it is advantageous to restrict the amount of linear siloxane hydrogen carrier compounds of formula (I) to less than 20 percent by weight, for example less than 10 percent by weight in the mixture; 0.01 percent by weight, or even 0.1 percent by weight of linear siloxane hydrogen carrier compounds of formula (I) can advantageously be present in said mixture.

In an embodiment according to the present invention, the hydrogen carrier compounds (C) (for example the siloxane hydrogen carrier compounds of formula (I) or of formula (II)) present a dynamic viscosity between 0.1 and 10000 mPa·s at a temperature of 20° C. and a pressure of $1.01325 \times 10^5$ Pa. In an embodiment according to the present invention, the compounds (C) (for example the siloxane hydrogen carrier compounds of formula (I) or of formula (II)) present a dynamic viscosity between 0.2 and 50 mPa·s at a temperature of 20° C. and a pressure of $1.01325 \times 10^5$ Pa. The dynamic viscosity at a temperature of 20° C. and a pressure of $1.01325 \times 10^5$ Pa of the compounds (C) (for example the siloxane hydrogen carrier compounds of formula (I) or of formula (II)) can be measured according to any appropriate method; for example, it can be determined according to the ISO 1628-1 norm.

In an embodiment according to the present invention, the molecular weight of the cyclic hydrogen carrier compounds (C) (for example the cyclic siloxane hydrogen carrier compounds of formula (I) or of formula (II)) may range from 130 to 1480 g/mol. The molecular weight of the compounds (C) (for example the siloxane hydrogen carrier compounds of formula (I) or of formula (II)) can be measured according to any appropriate method; for example, it can be determined by GC-MS, e.g. a GC-MS analysis performed on an Agilent GC/MSD 5975C apparatus.

In an embodiment according to the present invention, the number average molecular weight ($M_n$) and/or the molecular weight distribution (Đ) of the linear hydrogen carrier compounds (C) (for example the linear siloxane hydrogen carrier compounds of formula (I)) may range from 64 to 1 000 000 g/mol and from 1.1 to 50, respectively. The average molecular weight and the molecular weight distribution of the compounds (C) (for example the linear siloxane hydrogen carrier compounds of formula (I)) can be measured according to any appropriate method; for example, it can be determined according to the ISO 16014 norm.

In an embodiment according to the present invention, the cyclic hydrogen carrier compounds (C) (for example the cyclic siloxane hydrogen carrier compounds of formula (I) or of formula (II)) present a characteristic strong and sharp absorption band between 800 and 1000 cm$^{-1}$ corresponding to the SiH$_2$ units, when analysed by FT-IR. In an embodiment according to the present invention, the cyclic compounds (C) (for example the cyclic siloxane hydrogen carrier compounds of formula (I) or of formula (II)) present a characteristic strong and sharp absorption band between 850 and 950 cm$^{-1}$.

In an embodiment according to the present invention, the cyclic hydrogen carrier compounds (C) (for example the cyclic siloxane hydrogen carrier compounds of formula (I) or of formula (II)) present a characteristic resonance between 4.5 and 4.9 ppm corresponding to the SiH$_2$O units, when analysed by $^1$H NMR in CDCl$_3$ at 25° C. $^1$H NMR analyses can be performed on any appropriate spectrometer, e.g. a 400 MHz Bruker spectrometer.

In an embodiment according to the present invention, the cyclic hydrogen carrier compounds (C) (for example the cyclic siloxane hydrogen carrier compounds of formula (I) or of formula (II)) present a characteristic resonance between −45 and −50 ppm corresponding to the SiH$_2$O units, when analysed by $^{29}$Si NMR in CDCl$_3$ at 25° C. $^{29}$Si NMR analyses can be performed on any appropriate spectrometer, e.g. a 400 MHz Bruker spectrometer.

In an embodiment according to the present invention, the hydrogen carrier compounds (C) (for example the siloxane hydrogen carrier compounds of formula (I) or of formula (II)) present a refractive index between 1 and 2 at a temperature of 20° C. and at a wavelength of 589 nm. In an embodiment according to the present invention, the compounds (C) (for example the siloxane hydrogen carrier compounds of formula (I) or of formula (II)) present a refractive index between 1.2 and 1.5 at a temperature of 20° C. and at a wavelength of 589 nm. The refractive index of the compounds (C) (for example the siloxane hydrogen carrier compounds of formula (I)) can be measured according to any appropriate method; for example, it can be determined according to the ASTM D1218 norm.

In an embodiment according to the present invention, the hydrogen carrier compounds (C) (for example the siloxane hydrogen carrier compounds of formula (I) or of formula (II)) present a boiling point between 50 and 500° C. at a pressure of $1.01325 \times 10^5$ Pa, for example a boiling point comprised between 50 and 150° C. The boiling point of the compounds (C) (for example the siloxane hydrogen carrier compounds of formula (I)) can be measured according to any appropriate method; for example, it can be determined according to the ISO 918 norm.

In an embodiment according to the present invention, the hydrogen carrier compounds (C) (for example the siloxane hydrogen carrier compounds of formula (I) or of formula (II)) present a flash point between 50 and 500° C. The flash point of the compounds (C) (for example the siloxane hydrogen carrier compounds of formula (I)) can be measured according to any appropriate method; for example, it can be determined according to the ISO 3679 norm.

In an embodiment according to the present invention, the hydrogen carrier compounds (C) (for example the siloxane hydrogen carrier compounds of formula (I) or of formula (II)) are liquid (at a temperature of 20° C. and an absolute pressure of $1.01325 \times 10^5$ Pa).

According to an additional embodiment of the present invention, it has also been discovered that the hydrogen carrier compounds (C) (for example the liquid silane and/or siloxane hydrogen carrier compounds) can be produced from silica compound and/or silicate compound without requiring carbon containing reactant and/or without substantial carbon emissions, preferably without carbon emissions.

The silica compound according to the present invention can be defined as a silica containing compound, and/or a mixture of two or more of said silica containing compounds.

In an embodiment according to the present invention, the silica compound is selected from:
 a silica compound of generic formula SiO$_2$,$_x$H$_2$O,
 [SiO$_2$]$_n$ with n superior or equal to 2, or
 a mixture of two or more of said silica compounds.

The silicate compound according to the present invention can be defined as a silicate containing compound, and/or a mixture of two or more of said silicate containing compounds.

In an embodiment according to the present invention, the silicate compound is selected from:
- a sodium or potassium silicate compound of generic formula $Na_{2x}SiO_{2+x}$ or $K_{2x}SiO_{2+x}$ with x being an integer comprised between 0 and 2, or
- a silicic acid compound of generic formula $[SiO_x(OH)_{4-x}]^{x-}$ with x being an integer comprised between 0 and 4 or of generic formula $[SiO_x(OH)_{4-2x}]_n$ with when n=1, x=0 or 1 and when n=2, x=1/2 or 3/2, or
- a silicate compound with a polymeric structure such as a disilicate ion of structure $(Si_2O_7)^{6-}$ or a macroanion of generic structure $[SiO_3^{2-}]_n$, $[Si_4O_{11}^{6-}]_n$ or $[Si_2O_5^{2-}]_n$ with n superior or equal to 2, or
- a mixture of two or more of said silicate compounds.

It has also been discovered that the hydrogen carrier compounds (C) can be regenerated without requiring carbon containing reactant and/or without substantial carbon emissions, preferably without carbon emissions.

The most important advantages of the particular production/regeneration processes of the present invention consist in the possibility to apply it continuously; such continuous process can also, as explained hereafter, be operated without requiring raw materials input and/or without by-product emissions.

It has also been discovered that by using some hydrogen carrier compounds (C),
- hydrogen could be produced in large amounts, with high yields, in a very short time and with very low production costs, without energy input to release it; and
- it was possible to generate said hydrogen carrier compounds (C) without substantial carbon emissions, preferably without carbon emissions, by storing energy and recycling the by-products issued from the hydrogen production.

Water

In an embodiment of the present invention, the claimed method for producing hydrogen comprising the steps consisting in contacting a hydrogen carrier compound (C) comprising one or more Si—H bonds (i.e. a hydrogen carrier compound) with the claimed hydrogen release catalyst Y (together with the optional catalyst X) is characterised in that the contacting step is performed in the presence of water. Thus, the present invention also relates to a hydrogen carrier reacting mixture comprising a mixture of the hydrogen carrier compounds (C) and water. Water can advantageously be selected from various sources such as for example fresh water, running water, tap water, salt water, deionized water and/or distilled water.

In an embodiment of the present invention, the said mixture of the compound (C) and water is characterised by a ratio between the moles of water and the moles of the compound (C) multiplied by the number of [Si—H] bonds of compound (C) which is superior or equal to 0.05; said ratio is preferably comprised between 1 and 2.5.

In another embodiment which is particularly applicable when compound (C) is a polymer exhibiting repeating Si units, the above ratio is replaced by another ratio between the same moles of water relative to sum {of the moles of repeating units of the polymer multiplied by the number of Si—H bonds per repeating unit and the moles of chain ends multiplied by the number of Si—H bonds of its corresponding chain end}, said ratio being superior or equal to 0.05, preferably comprised between 1 and 2.5.

For example, for a polymer of structure A—$(X)_n$—A and of average molecular weight (Mn) in g/mol, the calculation is $[polymer] \times (2 \times y + \eta \times z) = (m_{polymer}/Mn) \times (2 \times y + \eta \times z)$, with [polymer] the amount in mol of polymer chains, y the number of Si—H bond per chain end, z the number of Si—H bond per repeating unit and η the average number of repeating unit per polymer chain.

For example, for phenylsilane (Ph-Sift), 3 Si—H bonds are present in the compound, hence the corresponding water/[Si—H] bond$_{phenylsilane}$ mixture will be characterised by a molar ratio value calculated as Ratio $H_2O/[Si—H]$ bond$_{phenylsilane}$ = $n_{H2O}/(3 \times n_{phenylsilane}) = (m_{H2O}/M_{H2O})/(3 \times m_{phenylsilane}/M_{phenylsilane}) = (M_{H2O}/M_{H2O})/(3 \times m_{phenylsilane}/M_{phenylsilane})$, m being the weight of compound in gram and M the molecular weight in gram per mol.

In an embodiment of the present invention, when the hydrogen carrier compounds (C) are the above siloxane hydrogen carrier compounds of formula (I) or formula (II), the corresponding mixture of the said compounds (C) and water is characterised by a water/[SiOH$_2$] unit molar ratio which is superior or equal to 0.1. In an embodiment of the present invention, the said mixture of the said compounds (C) and water is characterised by a water/[SiOH$_2$] unit molar ratio which is comprised between 2 and 5, for example between 2 and 2.5.

For example, for a polyhydrosiloxane "PHS", the corresponding water/PHS mixture will be characterised by a molar ratio value calculated as Ratio $H_2O/PHS = (m_{H2O}/M_{H2O})/(m_{PHS}/M_{siH2O}) = (m_{H2O}/18)/(m_{PHS}/46.11)$.

Hydrogen Release Initiator

In an embodiment of the present invention, the claimed method for producing hydrogen comprising the steps consisting in contacting a hydrogen carrier compound (C) comprising one or more Si—H bonds with the claimed hydrogen release catalyst Y (and the optional catalyst X) is characterised in that the contacting step is performed in the presence of at least one hydrogen release initiator (which is different from the claimed hydrogen release catalyst Y) and, optionally and preferably, water. Thus, the present invention also relates to a hydrogen carrier reacting mixture comprising a mixture of the compounds (C) and at least one hydrogen release initiator and optionally water. There is no restriction regarding the type of hydrogen release initiator which can be used according to the present invention as long as it favours the Si—H bond cleavage of the compounds (C) (for example the hydrolytic oxidation of the hydrogen carrier compounds (C) [e.g. of the siloxane hydrogen carrier compounds of formula (I)]; and thus the silane/siloxane reaction leading to the corresponding hydrogen release). For example, any compound which will favour the Si—H bond cleavage can advantageously be used as hydrogen release initiator.

In an embodiment according to the present invention, the hydrogen release initiator is selected amongst one or more compounds of the following list:
- a mineral base. For example, the mineral base can be an alkaline or alkaline-earth metal hydroxide such as potassium hydroxide or sodium hydroxide, the sodium hydroxide being particularly preferred;
- a compound able to release a nucleophile able to perform the hydrolytic oxidation of the siloxane hydrogen carrier compound such as, for example, a compound of formula RR'R"R'" ZY with Z being N or P, Y being OH, F, Cl or Br and R, R', R" and R'" can be advantageously selected amongst $C_1$-$C_{15}$ alkyl or $C_6$-$C_{10}$ aryl, with R, R', R", R'" being the same of different;
- a strong acid, for example a pure acid solution (e.g. $H_2SO_4$) or an aqueous mineral acid solution such as an aqueous solution of hydrochloric acid for instance.

In an embodiment of the present invention, the hydrogen release reacting mixture comprising the hydrogen carrier compounds (C) (e.g. silanes or siloxanes), the hydrogen release initiator, the claimed hydrogen release catalyst Y and optional catalyst X, and preferably water, is characterised by a ratio between the moles of hydrogen release initiator and the moles of the hydrogen carrier compound (C) multiplied by the number of [Si—H] bonds of compound (C), which is superior or equal to 0.005; preferably comprised between 0.02 and 0.5.

In another embodiment of the present invention, when the hydrogen carrier compounds (C) are the above siloxane hydrogen carrier compounds of formula (I) or formula (II), the hydrogen release reacting mixture comprising the said siloxane hydrogen carrier compounds, the hydrogen release initiator, the claimed hydrogen release catalyst Y and the optional catalyst X, and preferably water, is characterised by a hydrogen release initiator/[SiOH$_2$] unit molar ratio which is superior or equal to 0.01. In an embodiment of the present invention, the said hydrogen release reacting mixture is characterised by a hydrogen release initiator/[SiOH$_2$] unit molar ratio which is comprised between 0.05 and 1.

Optional Hydrogen Release Catalyst X

In an embodiment of the present invention, the claimed method for producing hydrogen comprising the steps consisting in contacting a hydrogen carrier compound (C) comprising one or more Si—H bonds with the claimed hydrogen release catalyst Y is characterised in that the contacting step is performed in the presence of an additional hydrogen release catalyst X (which is different from the claimed hydrogen release catalyst Y) and, optionally and preferably, at least one hydrogen release initiator and/or water. Thus, the present invention also relates to a hydrogen carrier reacting mixture comprising a mixture of the hydrogen carrier compounds (C) (e.g. the above silanes and/or the siloxane hydrogen carrier compounds of formula (I)) and an additional hydrogen release catalyst X (preferably as defined hereafter), and optionally and preferably, water and/or a hydrogen release initiator as defined above. There is no restriction regarding the type of catalyst X which can be used according to the present invention as long as it further increases the kinetic (i.e. the speed at which the hydrogen is released) of the Si—H bond cleavage (e.g. the hydrolytic oxidation of the above silanes and/or siloxane hydrogen carrier compounds of formula (I)); and thus the water/siloxane/hydrogen release initiator/claimed hydrogen release catalyst Y/catalyst X reaction leading to the corresponding hydrogen release. For example, any compound which will significantly increase the kinetic of the hydrolytic oxidation of the silane/siloxane can advantageously be used as catalyst X.

In an embodiment according to the present invention, the additional catalyst X is selected amongst one or more compounds of the following list:
- a phosphorous based catalyst (for example a polymer-supported catalyst bearing one or more phosphorous groups);
- an amine based catalyst (for example a polymer-supported catalyst bearing one or more amine groups), or an ammonium salt, for example RR'R"R'"NOH with R, R', R", R'" being a $C_1$-$C_{15}$ alkyl or a $C_6$-$C_{10}$ aryl, and R, R', R", R'" being the same of different; and
- hexamethylphosphoramide ("HMPA").

In an embodiment of the present invention, the claimed method for producing hydrogen comprising the steps consisting in contacting a hydrogen carrier compound (C) comprising one or more Si—H bonds with the claimed hydrogen release catalyst Y is characterised in that the contacting step is performed in the absence of catalyst X.

In another embodiment of the present invention, when the hydrogen carrier compounds (C) are the above siloxane hydrogen carrier compounds of formula (I) or formula (II), the hydrogen release reacting mixture comprising the said siloxane hydrogen carrier compounds, the claimed hydrogen release catalyst Y and the catalyst X, and preferably the water and/or the hydrogen release initiator, is characterised by a molar ratio of the sum of the {claimed catalyst Y and catalyst X} relative to the [SiOH$_2$] monomer units in compound (C) which is lower than or equal to 0.6, preferably ranges from 0.01 to 0.6, for example from 0.01 to 0.5. Preferably the molar ratio of the sum of the {claimed catalyst Y and catalyst X} relative to the [SiOH$_2$] monomer units in compound (C) ranges from 0.02 to 0.2, for example from 0.02 to 0.1. More preferably the molar ratio of the sum of the {claimed catalyst Y and catalyst X} relative to the [SiOH$_2$] monomer units in compound (C) is lower than 0.1, for example lower than or equal to 0.06.

For the purpose of the above calculations of the initiator and the catalyst X to [Si—H] bonds or [SiOH$_2$] unit molar ratios, when the chosen compound falls at the same time under the hydrogen release initiator definition and the catalyst X definition, it is its total amount which is used for the calculation of both ratios.

In an embodiment of the present invention, the said hydrogen release reacting mixture is characterised by a molar ratio of the sum of the {claimed catalyst Y and catalyst X} relative to the hydrogen release initiator (e.g. sodium hydroxide) which ranges from 0.02 to 0,5; Preferably the molar ratio of the sum of the {claimed catalyst Y and catalyst X} relative to the hydrogen release initiator ranges from 0.10 to 0.25. More preferably the molar ratio of the sum of the {claimed catalyst Y and catalyst X} relative to the hydrogen release initiator is lower than 0.20, e.g equal to 0.15.

Hydrogen Production

In an embodiment of the present invention, there is no restriction regarding the methods which can be used for the hydrogen production method according to the present invention as long as the hydrogen release does not require additional energy and satisfies the hydrogen industry requirements.

In an embodiment according to the present invention, the temperature of the method for the production of hydrogen from compounds (C) comprising one or more Si—H bonds in the presence of the claimed hydrogen release catalyst Y may vary in a wide range, and may range notably from 0 to 200° C. More preferably, the temperature ranges from 15 to 30° C.

In an embodiment according to the present invention, the pressure of the method for the production of hydrogen from compounds (C) comprising one or more Si—H bonds in the presence of the claimed hydrogen release catalyst Y may vary in a wide range, and may range notably from $1\times10^5$ Pa to $500\times10^5$ Pa.

In an embodiment according to the present invention, the method for the production of hydrogen from compounds (C) comprising one or more Si—II bonds in the presence of the claimed hydrogen release catalyst Y can tolerate the presence of a solvent. There is no restriction regarding the type of solvent which can be used for the hydrogen production method according to the present invention as long as the hydrogen release from the compounds (C) satisfies the hydrogen industry requirements. In an embodiment according to the present invention, said solvent is selected from alcohol (e.g. methanol), aqueous solvents, organic solvents and/or a mixture of two or more of said solvents.

In an embodiment according to the present invention, the method for the production of hydrogen from compounds (C) comprises the following steps: a) contacting the compounds (C) comprising one or more Si—H bonds and the claimed hydrogen release catalyst Y to form a compounds (C)/catalyst mixture, in the optional presence of a solvent, and: b) combining the mixture from step (a) with an aqueous solution of the hydrogen release initiator, in the optional presence of an additional catalyst X, to produce hydrogen. Steps a) and b) may occur consecutively or simultaneously.

In an embodiment according to the present invention, the reaction mixture used in the method for the production of hydrogen from compounds (C) is characterised in that
the compounds (C) comprising one or more Si—H bonds,
the corresponding silicate-type by-products,
the hydrogen,
the optional water,
the optional hydrogen release initiator(s),
the claimed hydrogen release catalyst Y,
the optional catalyst(s) X, and
the optional solvents represent at least 90 percent by weight of the said reaction mixture, preferably at least 95 percent by weight, for example at least 99 percent by weight, e.g. 100% by weight.

In an embodiment, the present invention also relates to a device for producing hydrogen according to the method hereabove described, said device comprising a reaction chamber comprising:
a reaction mixture inlet, said mixture comprising the compound (C) and an optional solvent;
an hydrogen outlet;
optionally a by-product collector; and
optionally a surface intended to be in contact with said mixture, coated with a polymer supported catalyst Y as described hereabove.

The following terms and expressions contained herein are defined as follows:
hydrogen carriers are either solid-state or liquid-state materials that contain hydrogen atoms, readily releasable as molecular dihydrogen (H2) when needed.

It should be obvious to those skilled in the art that the present invention enables embodiments under numerous other specific forms without leaving the field of application of the invention as claimed. Consequently, the present embodiments must be considered as illustrations, but may be modified in the defined field by the scope of the attached claims, and the invention must not be limited to the details given above.

EXAMPLES

Polyhydromethylsiloxane (PHMS), Thiourea, tetramethylurea, N,N-dimethylformamide, N,N-dimethylacetamide, Cyclohexanone, Diethylether, Acetone, 1,3-diphenylurea, 1,3-dimethyl-3,4,5,6-tetrahydro-2(1H)-pyrimidinone (DMPU), Tetramethylthiourea and Phenylsilane are used in the following examples.

DESCRIPTION OF THE EXPERIMENTAL SET-UP

A 60 mL PET preform was connected (by screwing) to a pressure tight ball lock coupler featuring an outlet nozzle for hydrogen gas evacuation and a female thread to which a stainless needle, equipped with a stainless stopcock, was crimped for reactants injection. The hydrogen gas outlet nozzle was connected, via a tee connector, on one hand to a pressure recorder in order to monitor the kinetic of the hydrogen release and on the other hand to an inverted 2 L measuring cylinder filled with water in order to measure to volume of hydrogen gas produced. The hydrogen release into the measuring cylinder was triggered by a ball valve and the hydrogen flow was controlled by a needle valve.

Comparative Example 1-C1

In a 60 mL PET preform was charged 1.022 g (17.00 mmol, 1.0 equiv.) of PHMS and 0.6 mL of NaOH (20 wt % in water) (3.6 mmol, 0.212 equiv.) was quickly added with a 1 mL syringe via the injection needle onto the reacting medium under vigorous stirring. The stopcock was closed and a pressure increase was observed on a period of 1200 seconds. When pressure increase stopped, the release on/off valve was opened and 10 mL (2,5% yield) of hydrogen gas were collected in the measuring cylinder.

Example 2

In a 60 mL PET preform was charged 1.001 g (16.65 mmol, 1.0 equiv.) of PHMS and 0.062 g (0.484 mmol, 0.029 equiv.) of DMPU. The solution was stirred at room temperature for a few seconds and 0.6 mL of NaOH (20 wt % in water) (3.6 mmol, 0.216 equiv.) was quickly added with a 1 mL syringe via the injection needle onto the reacting medium under vigorous stirring. The stopcock was closed and a pressure increase was observed on a period of 6.5 seconds along with formation of a white expanded solid. When pressure increase stopped, the release on/off valve was opened and 300 mL (75% yield) of hydrogen gas were collected in the measuring cylinder.

Example 3

In a 60 mL PET preform was charged 1.002 g (16.66 mmol, 1.0 equiv.) of PHMS and 0.053 g (0.456 mmol, 0.027 equiv.) of tetramethylurea. The solution was stirred at room temperature for a few seconds and 0.6 mL of NaOH (20 wt % in water) (3.6 mmol, 0.216 equiv.) was quickly added with a 1 mL syringe via the injection needle onto the reacting medium under vigorous stirring. The stopcock was closed and a pressure increase was observed on a period of 10 seconds along with formation of a white expanded solid. When pressure increase stopped, the release on/off valve was opened and 270 mL (68% yield) of hydrogen gas were collected in the measuring cylinder.

Example 4

In a 60 mL PET preform was charged 1.007 g (16.75 mmol, 1.0 equiv.) of PHMS and 0.109 g (0.514 mmol, 0.031 equiv.) of diphenylurea. The suspension was stirred at room temperature for a few seconds and 0.6 mL of NaOH (20 wt % in water) (3.6 mmol, 0.215 equiv.) was quickly added with a 1 mL syringe via the injection needle onto the reacting medium under vigorous stirring. The stopcock was closed and a pressure increase was observed on a period of 720 seconds along with formation of a white expanded solid. When pressure increase stopped, the release on/off valve was opened and 10 mL (2,5% yield) of hydrogen gas were collected in the measuring cylinder.

Example 5

In a 60 mL PET preform was charged 1.017 g (16.91 mmol, 1.0 equiv.) of PHMS and 0.036 g (0.413 mmol, 0.024 equiv.) of N,N-dimethylacetamide. The solution was stirred at room temperature for a few seconds and 0.6 mL of NaOH (20 wt % in water) (3.6 mmol, 0.216 equiv.) was quickly added with a 1 mL syringe via the injection needle onto the reacting medium under vigorous stirring. The stopcock was closed and a pressure increase was observed on a period of 500 seconds along with formation of a white expanded solid. When pressure increase stopped, the release on/off valve was opened and 270 mL (68% yield) of hydrogen gas were collected in the measuring cylinder.

Example 6

In a 60 mL PET preform was charged 1.022 g (17.00 mmol, 1.0 equiv.) of PHMS and 0.068 g (0.781 mmol, 0.046 equiv.) of N,N-dimethylacetamide. The solution was stirred at room temperature for a few seconds and 0.6 mL of NaOH (20 wt % in water) (3.6 mmol, 0.212 equiv.) was quickly added with a 1 mL syringe via the injection needle onto the reacting medium under vigorous stirring. The stopcock was closed and a pressure increase was observed on a period of 30 seconds along with formation of a white expanded solid. When pressure increase stopped, the release on/off valve was opened and 310 mL (78% yield) of hydrogen gas were collected in the measuring cylinder.

Example 7

In a 60 mL PET preform was charged 1.003 g (16.68 mmol, 1.0 equiv.) of PHMS and 0.036 g (0.493 mmol, 0.030 equiv.) of N,N-dimethylformamide. The solution was stirred at room temperature for a few seconds and 0.6 mL of NaOH (20 wt % in water) (3.6 mmol, 0.216 equiv.) was quickly added with a 1 mL syringe via the injection needle onto the reacting medium, under vigorous stirring. The stopcock was closed and a pressure increase was observed on a period of 1300 seconds along with formation of a white expanded solid. When pressure increase stopped, the release on/off valve was opened and 120 mL (30% yield) of hydrogen gas were collected in the measuring cylinder.

Example 8

In a 60 mL PET preform was charged 1.003 g (16.68 mmol, 1.0 equiv.) of PHMS and 0.045 g (0.591 mmol, 0.035 equiv.) of thiourea. The suspension was stirred at room temperature for a few seconds and 0.6 mL of NaOH (20 wt % in water) (3.6 mmol, 0.216 equiv.) was quickly added with a 1 mL syringe via the injection needle onto the reacting medium under vigorous stirring. The stopcock was closed and a pressure increase was observed on a period of 400 seconds along with formation of a white expanded solid. When pressure increase stopped, the release on/off valve was opened and 10 mL (2,5% yield) of hydrogen gas were collected in the measuring cylinder.

Example 9

In a 60 mL PET preform was charged 1.000 g (16.63 mmol, 1.0 equiv.) of PHMS and 0.066 g (0.499 mmol, 0.030 equiv.) of tetramethylthiourea. The suspension was stirred at room temperature for a few seconds and 0.6 mL of NaOH (20 wt % in water) (3.6 mmol, 0.216 equiv.) was quickly added with a 1 mL syringe via the injection needle onto the reacting medium under vigorous stirring. The stopcock was closed and a pressure increase was observed on a period of 700 seconds along with formation of a white expanded solid. When pressure increase stopped, the release on/off valve was opened and 40 mL (10% yield) of hydrogen gas were collected in the measuring cylinder.

Example 10

In a 60 mL PET preform was charged 0.063 g (0.476 mmol, 0.028 equiv.) of tetramethylthiourea and 0.707 g (9.54 mmol, 0.567 equiv.) of diethylether. The suspension was stirred vigorously until the solid dissolved. 1.012 g (16.83 mmol, 1.00 equiv.) of PHMS was then added to the PET preform. The solution was stirred at room temperature for a few seconds and 0.6 mL of NaOH (20 wt % in water) (3.6 mmol, 0.216 equiv.) was quickly added with a 1 mL syringe via the injection needle onto the reacting medium under vigorous stirring. The stopcock was closed and a pressure increase was observed on a period of 1500 seconds along with formation of a white expanded solid. When pressure increase stopped, the release on/off valve was opened and 320 mL (80% yield) of hydrogen gas were collected in the measuring cylinder.

Example 11

In a 60 mL PET preform was charged 1.007 g (16.75 mmol, 1.0 equiv.) of PHMS and 0.056 g (0.571 mmol, 0.034 equiv.) of cyclohexanone. The solution was stirred at room temperature for a few seconds and 0.6 mL of NaOH (20 wt % in water) (3.6 mmol, 0.215 equiv.) was quickly added with a 1 mL syringe via the injection needle onto the reacting medium under vigorous stirring. The stopcock was closed and a pressure increase was observed on a period of 600 seconds along with formation of a white expanded solid. When pressure increase stopped, the release on/off valve was opened and 260 mL (65% yield) of hydrogen gas were collected in the measuring cylinder.

Example 12

In a 60 mL PET preform was charged 0.993 g (16.51 mmol, 1.0 equiv.) of PHMS and 0.029 g (0.499 mmol, 0.0302 equiv.) of acetone. The solution was stirred at room temperature for a few seconds and 0.6 mL of NaOH (20 wt % in water) (3.6 mmol, 0.218 equiv.) was quickly added with a 1 mL syringe via the injection needle onto the reacting medium under vigorous stirring. The stopcock was closed and a pressure increase was observed on a period of 1400 seconds along with formation of a white expanded solid. When pressure increase stopped, the release on/off valve was opened and 80 mL (20% yield) of hydrogen gas were collected in the measuring cylinder.

Comparative Example C13

In a 60 mL PET preform was charged 0.599 g (5.55 mmol, 1.0 equiv.) of phenylsilane and 0.6 mL of NaOH (20 wt % in water) (3.6 mmol, 0.649 equiv.) was quickly added with a 1 mL syringe via the injection needle onto the reacting medium under vigorous stirring. The stopcock was closed and the reaction was left to run on a period of 130 sec before the release on/off valve was opened and 5 mL (0.8% yield) of H2 were collected in the measuring cylinder.

Example 14

In a 60 mL PET preform was charged 0.602 g (5.56 mmol, 1.0 equiv.) of phenylsilane and 0.028 g (0.218 mmol, 0.039 equiv.) of DMPU. The solution was stirred at room temperature for a few seconds and 0.6 mL of NaOH (20 wt % in water) (3.6 mmol, 0.647 equiv.) was quickly added with a 1 mL syringe via the injection needle onto the reacting medium under vigorous stirring. The stopcock was closed and a pressure increase was observed on a period of 90 seconds along with formation of a white expanded solid. When pressure increase stopped, the release on/off valve was opened and 310 mL (78% yield) of hydrogen gas were collected in the measuring cylinder.

Example 15

In a 60 mL PET preform was charged 0.605 g (5.59 mmol, 1.0 equiv.) of phenylsilane and 0.055 g (0.473 mmol, 0.085 equiv.) of tetramethylurea. The solution was stirred at room temperature for a few seconds and 0.6 mL of NaOH (20 wt % in water) (3.6 mmol, 0.644 equiv.) was quickly added with a 1 mL syringe via the injection needle onto the reacting medium under vigorous stirring. The stopcock was closed and a pressure increase was observed on a period of 130 seconds along with formation of a white expanded solid. When pressure increase stopped, the release on/off valve was opened and 340 mL (85% yield) of hydrogen gas were collected in the measuring cylinder.

TABLE 1

Figure 1:
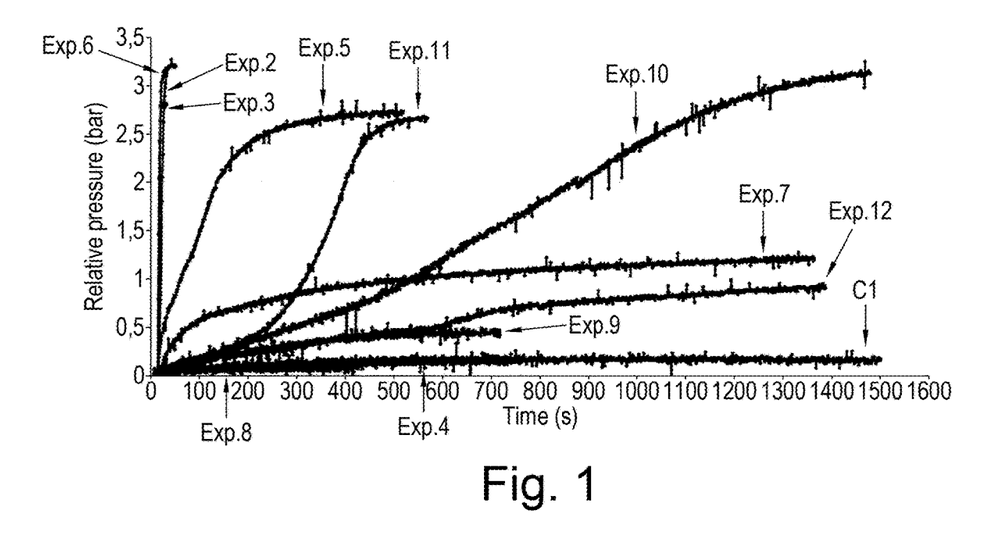
FIG. 1 describes the evolution of the relative pressure in the system as a function of depending on the nature of the catalyst with PHMS as hydrogen carrier compound FIG. 2 describes the evolution of the relative pressure in the system as a function of time depending on the nature of the catalyst with phenylsilane as hydrogen carrier compound Table 1 gives a summary of the performances of the catalysts respectively used in examples 2 to 12 for the H2 production from PHMS
Figure 2:
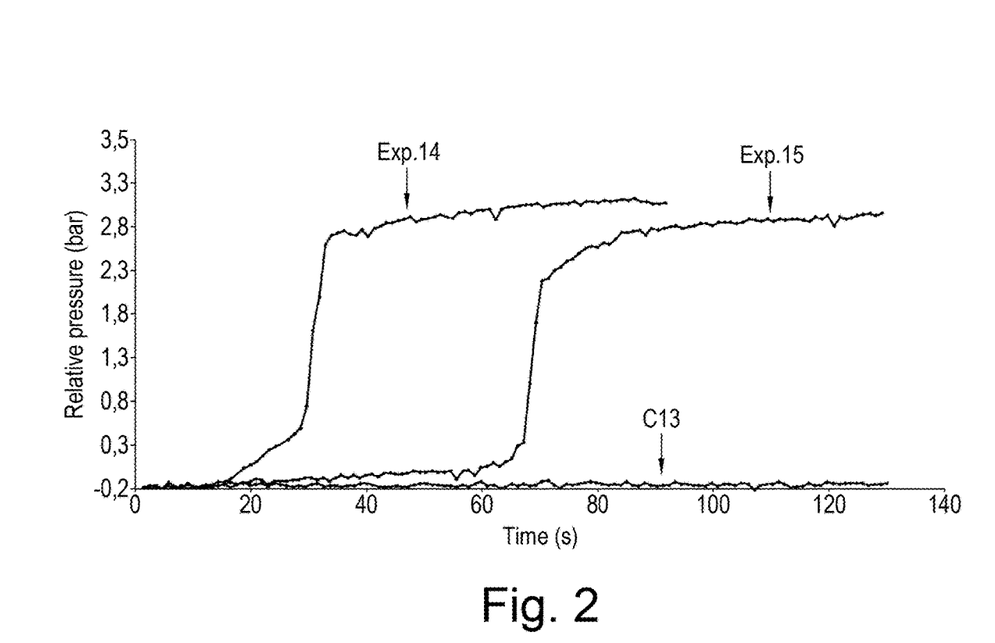

| Example | Catalyst | | Loading (mol %) | Release time (s) | Yield |
|---|---|---|---|---|---|
| C1 | — | | — | 1200 | 10 mL (2,5%) |
| 2 |  | DMPU | 2,9 | 6,5 | 300 mL (75%) |
| 3 |  | tetramethylurea | 2,7 | 10 | 270 mL (68%) |
| 4 |  | diphenylurea | 3,1 | 720 | 10 mL (2,5%) |
| 5 |  | N,N-dimethylacetamide | 2,4 | 500 | 270 mL (68%) |
| 6 |  | N,N-dimethylacetamide | 4,6 | 30 | 310 mL (78%) |
| 7 |  | N,N-dimethylformamide (DMF) | 3,0 | 1300 | 120 mL (30%) |
| 8 |  | thiourea | 3,5 | 400 | 10 mL (2,5%) |

TABLE 1-continued

| Example | Catalyst | | Loading (mol %) | Release time (s) | Yield |
|---|---|---|---|---|---|
| 9 | ![structure] | tetramethylthiourea | 3,0 | 700 | 40 mL (10%) |
| 10 | ![structure] | Tetramethylthiourea + Et$_2$O | 2,8 | 1500 | 320 mL (80%) |
| 11 | ![structure] | Cyclohexanone | 3,4 | 600 | 260 mL (65%) |
| 12 | ![structure] | Acetone | 3,0 | 1400 | 80 mL (20%) |

Table 2 gives a summary of the performances of DMPU and Tetramethylurea as catalysts for the H$_2$ production from Phenylsilane

TABLE 2

| Example | Catalyst | | Loading (mol %) | Release time (s) | Yield |
|---|---|---|---|---|---|
| C13 | — | — | — | 130 | 5 mL (0,8%) |
| 14 | ![structure] | DMPU | 3,9 | 90 | 310 mL (78%) |
| 15 | ![structure] | tetramethylurea | 8,5 | 130 | 340 mL (85%) |

What is claimed is:

1. Method for producing hydrogen comprising contacting a hydrogen carrier compound (C) comprising one or more Si—H bonds with a first hydrogen release catalyst and optionally with a second an optional hydrogen release catalyst wherein the first hydrogen release catalyst is selected from formula wherein Y is O or S, and X1 and X2 are each independently selected from halogen, C1-C10 alkyl, C3-C10 cycloalkyl, C6-C12 aryl, C6-C12 aralkyl, 5 to 10-membered heteroaryl, OR$^3$, and SiR$^6$R$^7$R$^8$, wherein said alkyl and aryl groups are optionally substituted by one to three R$^9$ groups Or X1 and X2=—CR$^a$R$^b$ which form together with the carbon atom to which they are attached a 3 to 10-membered cycloalkyl, optionally substituted by one to three R$^9$ groups and R$^a$ and R$^b$ are each independently selected from H, halogen, C1-C10 alkyl, C3-C10 cycloalkyl, C6-C12 aryl, C6-C12 aralkyl, 5 to 10-membered heteroaryl, and OR$^{10}$, wherein said alkyl and aryl groups are optionally substituted by one to three R$^9$ groups Or X1 and X2=NR$^a$R$^b$ with R$^a$ and R$^b$ each independently selected from H, halogen, C1-C10 alkyl, C3-C10 cycloalkyl, C6-C12 aryl, C6-C12 aralkyl, 5 to 10-membered heteroaryl, and OR$^{10}$, wherein said alkyl and aryl groups are optionally substituted by one to three R$^9$ groups

Or
X1 is selected from H, halogen, C1-C10 alkyl, C3-C10 cycloalkyl, C6-C12 aryl, C6-C12 aralkyl, 5 to 10-membered heteroaryl, OR$^3$, and SiR$^6$R$^7$R$^8$ and X2=NR$^a$R$^b$ with R$^a$ and R$^b$ each independently selected from H, halogen, C1-C10 alkyl, C3-C10 cycloalkyl, C6-C12 aryl, C6-C12 aralkyl, 5 to 10-membered heteroaryl, and OR$^{10}$, wherein said alkyl and aryl groups are optionally substituted by one to three R$^9$ groups

Or
X1 and X2=NR$^c$ which form together with the carbon atom to which they are attached a 3 to 10-membered heterocycloalkyl, optionally substituted by one to three R$^9$ groups and R$^c$ is selected from H, halogen, C1-C10 alkyl, C3-C10 cycloalkyl, C6-C12 aryl, C6-C12 aralkyl, 5 to 10-membered heteroaryl, and OR$^{10}$, wherein said alkyl and aryl groups are optionally substituted by one to three R$^9$ groups Or
X1=—CR$^a$R$^b$ with R$^a$ and R$^b$ each independently selected from H, halogen, C1-C10 alkyl, C3-C10 cycloalkyl, C6-C12 aryl, C6-C12 aralkyl, 5 to 10-membered heteroaryl, and OR$^{10}$ and X2=NR$^c$ which form together with the carbon atom to which they are attached a 3 to 10-membered heterocycloalkyl, optionally substituted by one to three R$^9$ groups with R$^c$ selected from H, halogen, C1-C10 alkyl, C3-C10 cycloalkyl, C6-C12 aryl, aralkyl, 5 to 10-membered heteroaryl, and OR$^{10}$, wherein said alkyl and aryl groups are optionally substituted by one to three R$^9$ groups wherein
R$^3$ is selected from H, C1-C6 alkyl, C6-C10 aryl, and C6-C12 aralkyl;
R$^6$, R$^7$, and R$^8$ are each independently selected from H, OR$^3$, C1-C6 alkyl, C6-C10 aryl, and C6-C12 aralkyl;
R$^9$ is selected from halogen, C1-C10 alkyl, C3-C10 cycloalkyl, C6-C12 aryl, C6-C12 aralkyl, 5 to 10-membered heteroaryl, OR$^{10}$, NO$_2$, NR$^{11}$R$^{12}$, CN, C(=O)R$^{10}$, C(=O)OR$^{10}$, and S(=O)CH$_3$, wherein said alkyl and aryl groups are optionally substituted by one or more halogen or C1-C10 alkyl or OR$^3$;
R$^{10}$ is selected from H, C1-C6 alkyl, C6-C10 aryl, and C6-C12 aralkyl; and
R$^{11}$ and R$^{12}$ are each independently selected from H and C1-C10 alkyl, and wherein the ratio between the sum of the moles of the first hydrogen release catalyst and the moles of the second hydrogen release catalyst, when the hydrogen carrier compound (C) is optionally contacted with the second hydrogen release catalyst, relative to the moles of the hydrogen carrier compound (C) multiplied by the number of [Si—H] bonds of compound (C) is inferior or equal to 0.3, and/or
wherein the ratio between the sum of the mass of the first hydrogen release catalyst and the mass of the second hydrogen release catalyst, when the hydrogen carrier compound (C) is optionally contacted with the second hydrogen release catalyst, relative to the mass of the hydrogen carrier compound (C) is inferior or equal to 0.2.

2. Method for producing hydrogen according to claim 1, wherein the compound (C) comprises one or more monomer units of the following formulae:

and wherein
R is selected from a bond, C$_1$-C$_6$ alkylene and (C$_1$-C$_4$ alkylene)q-Z-(C$_1$-C$_4$ alkylene)r;
Z is selected from O, NR$^{10}$, S(O)$_y$, CR$^{10}$=CR$^{10}$, C≡C, C6-C10 arylene, 5-10 membered heteroarylene, and C3-C6 cycloalkylene;
R$^1$ and R$^2$ are each independently selected from H, halogen, C1-C10 alkyl, C3-C10 cycloalkyl, C6-C12 aryl, aralkyl, 5 to 10-membered heteroaryl, OR$^3$, NR$^4$R$^5$, and SiR$^6$R$^7$R$^8$, wherein said aryl groups are optionally substituted by one to three R$^9$ groups;
R$^{1'}$ and R$^{2'}$ are each independently selected from H, halogen, C1-C10 alkyl, C3-C10 cycloalkyl, C6-C12 aryl, aralkyl, 5 to 10-membered heteroaryl, OR$^3$, NR$^4$R$^5$, and SiR$^6$R$^7$R$^8$, wherein said aryl groups are optionally substituted by one to three R$^9$ groups;
R$^3$ is selected from H, C1-C6 alkyl, C6-C10 aryl, and C6-C12 aralkyl;
R$^4$ and R$^5$ are each independently selected from H, C1-C6 alkyl, C6-C10 aryl, and C6-C12 aralkyl;
R$^6$, R$^7$, and R$^8$ are each independently selected from H, OR$^3$, C1-C6 alkyl, C6-C10 aryl, C6-C12 aralkyl, and SiH$_3$;
R$^9$ is selected from halogen, C1-C10 alkyl, OR$^{10}$, NO$_2$, NR$^{11}$R$^{12}$, CN, C(=O)R$^{10}$, C(=O)OR$^{10}$, and S(=O)CH$_3$, wherein said alkyl group is optionally substituted by one or more halogen;
R$^{10}$ is H or C1-C3 alkyl;
R$^{11}$ and R$^{12}$ are each independently selected from H and C1-C10 alkyl;
q and r are 0 or 1;
y is 0, 1 or 2;
m, n and p are integers representing the number of repeating units, with n being superior or equal to 1, p being 0 or 1 and m being 0 or 1;
A and B are each independently selected from H, halogen, C1-C10 alkyl, C3-C10 cycloalkyl, C6-C12 aryl, C6-C12 aralkyl, 5 to 10-membered heteroaryl, OR$^3$, OSiR$^6$R$^7$R$^8$, NR$^4$R$^5$, SiR$^6$R$^7$R$^8$, and CR$^{13}$R$^{14}$R$^{15}$ wherein said aryl groups are optionally substituted by one to three R$^9$ groups;
R$^{13}$, R$^{14}$, and R$^{15}$ are each independently selected from H, halogen, C1-C10 alkyl, C3-C10 cycloalkyl, C6-C12 aryl, C6-C12 aralkyl, 5 to 10-membered heteroaryl, OR$^3$, NR$^4$R$^5$, and SiR$^6$R$^7$R$^8$, and
wherein the compound (C) comprises at least one group Si-H.

3. Method for producing hydrogen according to claim 2 wherein, in the compound (C) formulae,
p=0 and m=1; and/or
R$^1$=Me or H; and/or
R$^1$ is Me and n is superior to 1 and inferior to 15,000.

4. Method for producing hydrogen according to claim 2, wherein compound (C) is Polyhydromethylsiloxane.

5. Method for producing hydrogen according to claim 2, wherein the compound (C) comprises one or more monomer units of the following formulae wherein R¹ is H and n is superior to 1.

6. Method for producing hydrogen according to claim 2 wherein, in the compound (C) formulae, A=SiMe₃, Me or SiH₃ and B=OMe, OSiMe₃ or OSiH₃.

7. Method for producing hydrogen according to claim 2 wherein the compound (C) comprises one or more monomer units of the following formulae wherein n is between 1 and 30.

8. Method for producing hydrogen according to claim 1 wherein the ratio between the sum of the moles of the first hydrogen release catalyst and the moles of the second hydrogen release catalyst, when the hydrogen carrier compound (C) is optionally contacted with the second hydrogen release catalyst, relative to the moles of the hydrogen carrier compound (C) multiplied by the number of [Si—H] bonds of compound (C) ranges from 0.005 to 0.3, and/or wherein the ratio between the sum of the mass of the first hydrogen release catalyst and the mass of the second hydrogen release catalyst, when the hydrogen carrier compound (C) is optionally contacted with the second hydrogen release catalyst, relative to the mass of the hydrogen carrier compound (C) is between 0.01 and 0.2.

9. Method for producing hydrogen according to claim 1, wherein the ratio between the sum of the moles of the first hydrogen release catalyst and the moles of the second hydrogen release catalyst, when the hydrogen carrier compound (C) is optionally contacted with the second hydrogen release catalyst, relative to the moles of the hydrogen carrier compound (C) multiplied by the number of [Si—H] bonds of compound (C) ranges from 0.01 to 0.1, and/or wherein the ratio between the sum of the mass of the first hydrogen release catalyst and the mass of the second hydrogen release catalyst, when the hydrogen carrier compound (C) is optionally contacted with the second hydrogen release catalyst, relative to the mass of the hydrogen carrier compound (C) is comprised between 0.02 and 0.07.

10. Method for producing hydrogen comprising contacting a hydrogen carrier compound (C) comprising one or more Si—H bonds with a first hydrogen release catalyst and optionally with a second hydrogen release catalyst wherein the first hydrogen release catalyst is selected from the following first hydrogen release catalyst formula wherein Y is O or S, and X1 and X2 are each independently selected from halogen, C1-C10 alkyl, C3-C10 cycloalkyl, C6-C12 aryl, C6-C12 aralkyl, 5 to 10-membered heteroaryl, OR³, and SiR⁶R⁷R⁸, wherein said alkyl and aryl groups are optionally substituted by one to three R⁹ groups Or X1 and X2=—CR$^a$R$^b$ which form together with the carbon atom to which they are attached a 3 to 10-membered cycloalkyl, optionally substituted by one to three R⁹ groups and R$^a$ and R$^b$ are each independently selected from H, halogen, C1-C10 alkyl, C3-C10 cycloalkyl, C6-C12 aryl, C6-C12 aralkyl, 5 to 10-membered heteroaryl, and OR¹⁰, wherein said alkyl and aryl groups are optionally substituted by one to three R⁹ groups Or X1 and X2=NR$^a$R$^b$ with R$^a$ and R$^b$ each independently selected from H, halogen, C1-C10 alkyl, C3-C10 cycloalkyl, C6-C12 aryl, C6-C12 aralkyl, 5 to 10-membered heteroaryl, and OR¹⁰, wherein said alkyl and aryl groups are optionally substituted by one to three R⁹ groups Or X1 is selected from H, halogen, C1-C10 alkyl, C3-C10 cycloalkyl, C6-C12 aryl, C6-C12 aralkyl, 5 to 10-membered heteroaryl, OR³, and SiR⁶R⁷R⁸ and X2=NR$^a$R$^b$ with R$^a$ and R$^b$ each independently selected from H, halogen, C1-C10 alkyl, C3-C10 cycloalkyl, C6-C12 aryl, C6-C12 aralkyl, 5 to 10-membered heteroaryl, and OR¹⁰, wherein said alkyl and aryl groups are optionally substituted by one to three R⁹ groups Or X1 and X2=NR$^c$ which form together with the carbon atom to which they are attached a 3 to 10-membered heterocycloalkyl, optionally substituted by one to three R⁹ groups and R$^c$ is selected from H, halogen, C1-C10 alkyl, C3-C10 cycloalkyl, C6-C12 aryl, C6-C12 aralkyl, 5 to 10-membered heteroaryl, and OR¹⁰, wherein said alkyl and aryl groups are optionally substituted by one to three R⁹ groups Or X1=—CR$^a$R$^b$ where R$^a$ and R$^b$ are each independently selected from H, halogen, C1-C10 alkyl, C3-C10 cycloalkyl, C6-C12 aryl, C6-C12 aralkyl, 5 to 10-membered heteroaryl, and OR¹⁰ and X2=NR$^c$ which form together with the carbon atom to which they are attached a 3 to 10-membered heterocycloalkyl, optionally substituted by one to three R⁹ groups with R$^c$ selected from H, halogen, C1-C10 alkyl, C3-C10 cycloalkyl, C6-C12 aryl, aralkyl, 5 to 10-membered heteroaryl, and OR¹⁰, wherein said alkyl and aryl groups are optionally substituted by one to three R⁹ groups wherein R³ is selected from H, C1-C6 alkyl, C6-C10 aryl, and C6-C12 aralkyl;

R⁶, R⁷, and R⁸ are each independently selected from H, OR³, C1-C6 alkyl, C6-C10 aryl, and C6-C12 aralkyl;

R⁹ is selected from halogen, C1-C10 alkyl, C3-C10 cycloalkyl, C6-C12 aryl, C6-C12 aralkyl, 5 to 10-membered heteroaryl, OR¹⁰, NO₂, NR¹¹R¹², CN, C(=O)R¹⁰, C(=O)OR¹⁰, and S(=O)CH₃, wherein said alkyl and aryl groups are optionally substituted by one or more halogen or C1-C10 alkyl or OR³;

R¹⁰ is selected from H, C1-C6 alkyl, C6-C10 aryl, and C6-C12 aralkyl; and $R^{11}$ and $R^{12}$ are each independently selected from H and C1-C10 alkyl, and wherein the hydrogen carrier compound (C) is selected amongst siloxane hydrogen carrier compounds comprising one or more units of formula (I):

formula (I)

wherein n is an integer superior or equal to 3 and inferior or equal to 500, and wherein the molar ratio of the sum of the {first hydrogen release catalyst and the second hydrogen release catalyst when the hydrogen carrier compound (C) is optionally contacted with the second hydrogen release catalyst} relative to the [SiOH$_2$] monomer units in compound (C) is lower than or equal to 0.6.

11. Method for producing hydrogen according to claim 10 wherein the molar ratio of the sum of the {first hydrogen release catalyst and the second hydrogen release catalyst when the hydrogen carrier compound (C) is optionally contacted with the second hydrogen release catalyst} relative to the [SiOH$_2$] monomer units in compound (C) ranges from 0.01 to 0.5.

12. Method for producing hydrogen according to claim 10, wherein Y is O in the first hydrogen release catalyst formula.

13. Method for producing hydrogen according to claim 10, wherein X1 is —NR$^a$R$^b$ in the first hydrogen release catalyst formula.

14. Method for producing hydrogen according to claim 10, wherein X1 and X2 are both selected from —NR$^a$R$^b$ in the first hydrogen release catalyst formula.

15. Method for producing hydrogen according to claim 10, wherein the first hydrogen release catalyst is selected from 1,3-dimethyl-3,4,5,6-tetrahydro-2(1H)-pyrimidinone (DMPU), tetramethylurea, urea, N,N-dimethylacetamide, cyclohexanone, and mixtures thereof.

16. Method for producing hydrogen according to claim 10, wherein the first hydrogen release catalyst is supported.

17. Method for producing hydrogen according to claim 10, wherein the compound (C) comprises one or more monomer units of the following formulae wherein n is inferior to 500.

18. Method for producing hydrogen according to claim 10, wherein the compound (C) is wherein n is an integer superior or equal to one and inferior or equal to 32.

19. Method for producing hydrogen according to claim 10, wherein contacting the hydrogen carrier compound (C) with the first hydrogen release catalyst is performed in the absence of the second hydrogen release catalyst.

* * * * *